United States Patent [19]

Laman et al.

[11] Patent Number: 5,153,739
[45] Date of Patent: Oct. 6, 1992

[54] INK CATALOG FOR A TWO COLOR PRINTER

[75] Inventors: Robert R. Laman, Torrance; Mark Gaines, Hawthorne, both of Calif.

[73] Assignee: Xerox Corporation, Stamford, Conn.

[21] Appl. No.: 756,245

[22] Filed: Sep. 6, 1991

[51] Int. Cl.⁵ .................. H04N 1/21; H04N 1/23; H04N 1/29; G03G 15/01
[52] U.S. Cl. ...................... 358/300; 358/75; 358/298; 355/327; 355/328
[58] Field of Search ............ 358/75, 296, 298, 300; 346/157; 355/38, 326, 327, 328

[56] References Cited

U.S. PATENT DOCUMENTS

| | | | |
|---|---|---|---|
| 4,777,510 | 10/1988 | Russel | 355/328 X |
| 4,901,114 | 2/1990 | Parker et al. | 355/328 X |
| 4,953,104 | 8/1990 | Yeh et al. | 346/157 X |
| 5,028,991 | 7/1991 | Sekizawa et al. | 358/75 |

Primary Examiner—Benjamin R. Fuller
Assistant Examiner—Eric Frahm
Attorney, Agent, or Firm—Robert E. Cunha

[57] ABSTRACT

A catalog of fonts, each font differing with the others in the bit patterns contained in its characters which when printed yield a different color, all fonts comprising the same number of identical characters, the characters being a predetermined number of shapes that can be assembled together to form an area. To the printer, the catalog appears to be a number of fonts, and can therefore be accessed by a printer that has a typical hardware system for printing text. However, when printed using a two-color printer, the printed output will be an area of any size filled in with the specified color.

2 Claims, 34 Drawing Sheets

| |
|---|
| number of SCREEN Definitions |
| maximum distance |
| value$_b$ |
| value$_n$ |
| reserved word |
| reserved word |
| block offset to screen |
| word offset to screen |
| ⋮ |

FIG. 10

| |
|---|
| reserved word (0) |
| size$_N$ |
| size$_M$ |
| length of bitmap |
| bitmap data |
| ⋮ |

FIG. 12

| |
|---|
| character reference$_b$ |
| character reference$_h$ |
| reserved word |
| reserved word |
| size$_N$ |
| size$_M$ |
| length of bitmap |
| number of bitmaps |
| bitmap data$_b$ |
| ⋮ |
| bitmap data$_h$ |
| ⋮ |

The 8 bit × 8 bit ink... replicated 3 times to give a width of 32 bits

| bit#: | 31 | 30 | 29 | 28 | 27 | 26 | 25 | 24 | 31 | ... | 0 |
|---|---|---|---|---|---|---|---|---|---|---|---|
| row$_0$ | 7$_0$ | 6$_0$ | 5$_0$ | 4$_0$ | 3$_0$ | 2$_0$ | 1$_0$ | 0$_0$ | 7$_0$ | ... | 0$_0$ |
| row$_1$ | 7$_1$ | 6$_1$ | 5$_1$ | 4$_1$ | 3$_1$ | 2$_1$ | 1$_1$ | 0$_1$ | 7$_1$ | ... | 0$_1$ |
| ... | ... | ... | ... | ... | ... | ... | ... | ... | ... | ... | ... |
| row$_7$ | 7$_7$ | 6$_7$ | 5$_7$ | 4$_7$ | 3$_7$ | 2$_7$ | 1$_7$ | 0$_7$ | 7$_7$ | ... | 0$_7$ |
| row$_8$ | 7$_0$ | 6$_0$ | 5$_0$ | 4$_0$ | 3$_0$ | 2$_0$ | 1$_0$ | 0$_0$ | 7$_0$ | ... | 0$_0$ |
| ... | ... | ... | ... | ... | ... | ... | ... | ... | ... | ... | ... |
| row$_{31}$ | 7$_7$ | 6$_7$ | 5$_7$ | 4$_7$ | 3$_7$ | 2$_7$ | 1$_7$ | 0$_7$ | 7$_7$ | ... | 0$_7$ |

... replicated 3 times to give a height of 32 bits

FIG. 16

The rightmost 7 bits of the 8 bit × 8 bit ink... padded with Zeros to give a width of 16 bits

| bit#: | 15 | 14 | 13 | 12 | 11 | 10 | 9 | 8 | 7 | ... | 0 |
|---|---|---|---|---|---|---|---|---|---|---|---|
| row$_0$ | 6$_0$ | 5$_0$ | 4$_0$ | 3$_0$ | 2$_0$ | 1$_0$ | 0$_0$ | Z | Z | ... | Z |
| row$_1$ | 6$_1$ | 5$_1$ | 4$_1$ | 3$_1$ | 2$_1$ | 1$_1$ | 0$_1$ | Z | Z | ... | Z |
| ... | ... | ... | ... | ... | ... | ... | ... | ... | ... | ... | ... |
| row$_7$ | 6$_7$ | 5$_7$ | 4$_7$ | 3$_7$ | 2$_7$ | 1$_7$ | 0$_7$ | Z | Z | ... | Z |
| row$_8$ | 6$_0$ | 5$_0$ | 4$_0$ | 3$_0$ | 2$_0$ | 1$_0$ | 0$_0$ | Z | Z | ... | Z |
| ... | ... | ... | ... | ... | ... | ... | ... | ... | ... | ... | ... |
| row$_{31}$ | 6$_7$ | 5$_7$ | 4$_7$ | 3$_7$ | 2$_7$ | 1$_7$ | 0$_7$ | Z | Z | ... | Z |

... replicated 3 times to give a height of 32 bits

... padded with Zeros to give a width of 16 bits

The rightmost 3 bits of the 8 bit x 8 bit ink...

| bit#: | 15 | 14 | 13 | 12 | 11 | 10 | 9 | 8 | 7 | ... | 0 |
|---|---|---|---|---|---|---|---|---|---|---|---|
| row$_0$ | 2$_0$ | 1$_0$ | 0$_0$ | Z | Z | Z | Z | Z | Z | ... | Z |
| row$_1$ | 2$_1$ | 1$_1$ | 0$_1$ | Z | Z | Z | Z | Z | Z | ... | Z |
| ... | ... | ... | ... | ... | ... | ... | ... | ... | ... | ... | ... |
| row$_7$ | 2$_7$ | 1$_7$ | 0$_7$ | Z | Z | Z | Z | Z | Z | ... | Z |
| row$_8$ | 2$_0$ | 1$_0$ | 0$_0$ | Z | Z | Z | Z | Z | Z | ... | Z |
| ... | ... | ... | ... | ... | ... | ... | ... | ... | ... | ... | ... |
| row$_{31}$ | 2$_7$ | 1$_7$ | 0$_7$ | Z | Z | Z | Z | Z | Z | ... | Z |

... replicated 3 times to give a height of 32 bits

←— abuts left edge of rectangle being filled abuts page-aligned *fill character* —→

FIG. 17

... padded with Zeros to give a width of 16 bits

The lower-rightmost 7 bits of the 8 bit x 8 bit ink...

| bit#: | 15 | 14 | 13 | 12 | 11 | 10 | 9 | 8 | 7 | ... | 0 |
|---|---|---|---|---|---|---|---|---|---|---|---|
| row$_1$ | 6$_1$ | 5$_1$ | 4$_1$ | 3$_1$ | 2$_1$ | 1$_1$ | 0$_1$ | Z | Z | ... | Z |
| ... | ... | ... | ... | ... | ... | ... | ... | ... | ... | ... | ... |
| row$_7$ | 6$_7$ | 5$_7$ | 4$_7$ | 3$_7$ | 2$_7$ | 1$_7$ | 0$_7$ | Z | Z | ... | Z |

←— abuts left edge of rectangle being filled abuts page-aligned *leading scans character* —→

The lowermost 7 rows of the 8 bit x 8 bit ink...

... replicated 3 times to give a width of 32 bits

| bit#: | 31 | 30 | 29 | 28 | 27 | 26 | 25 | 24 | 23 | ... | 0 |
|---|---|---|---|---|---|---|---|---|---|---|---|
| row$_1$ | 7$_1$ | 6$_1$ | 5$_1$ | 4$_1$ | 3$_1$ | 2$_1$ | 1$_1$ | 0$_1$ | 7$_1$ | ... | 0$_1$ |
| ... | ... | ... | ... | ... | ... | ... | ... | ... | ... | ... | ... |
| row$_7$ | 7$_7$ | 6$_7$ | 5$_7$ | 4$_7$ | 3$_7$ | 2$_7$ | 1$_7$ | 0$_7$ | 7$_7$ | ... | 0$_7$ |

FIG. 20

The leftmost 7 bits of the 8 bit x 8 bit ink...

... padded with Zeros to give a width of 16 bits

... replicated 3 times to give a height of 32 bits

| bit#: | 15 | 14 | 13 | 12 | 11 | 10 | 9 | 8 | 7 | ... | 0 |
|---|---|---|---|---|---|---|---|---|---|---|---|
| row$_0$ | 7$_0$ | 6$_0$ | 5$_0$ | 4$_0$ | 3$_0$ | 2$_0$ | 1$_0$ | Z | Z | ... | Z |
| row$_1$ | 7$_1$ | 6$_1$ | 5$_1$ | 4$_1$ | 3$_1$ | 2$_1$ | 1$_1$ | Z | Z | ... | Z |
| ... | ... | ... | ... | ... | ... | ... | ... | ... | ... | ... | ... |
| row$_7$ | 7$_7$ | 6$_7$ | 5$_7$ | 4$_7$ | 3$_7$ | 2$_7$ | 1$_7$ | Z | Z | ... | Z |
| row$_8$ | 7$_0$ | 6$_0$ | 5$_0$ | 4$_0$ | 3$_0$ | 2$_0$ | 1$_0$ | Z | Z | ... | Z |
| ... | ... | ... | ... | ... | ... | ... | ... | ... | ... | ... | ... |
| row$_{31}$ | 7$_7$ | 6$_7$ | 5$_7$ | 4$_7$ | 3$_7$ | 2$_7$ | 1$_7$ | Z | Z | ... | Z |

←abuts Dimensioned *large fill character* abuts right edge of rectangle being filled→

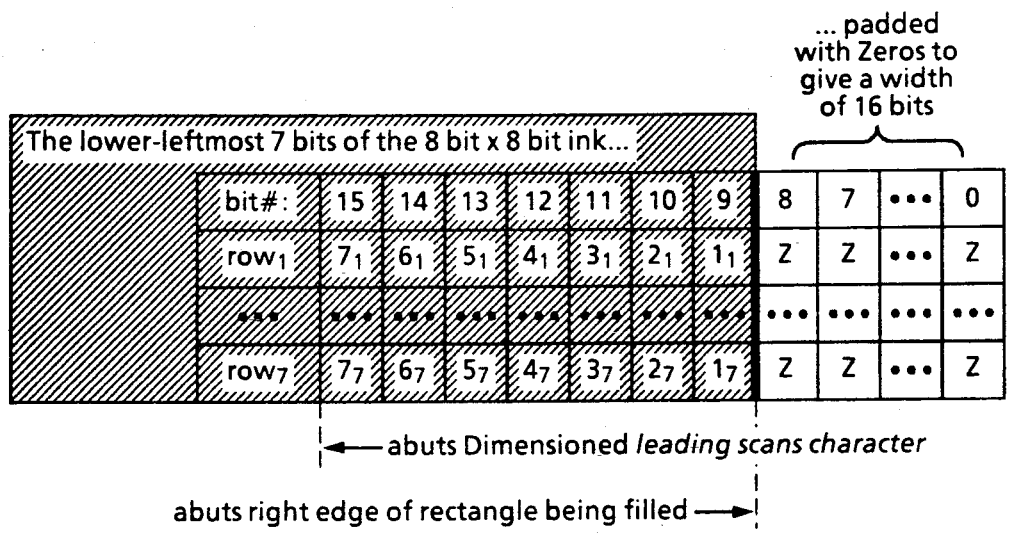
FIG. 21
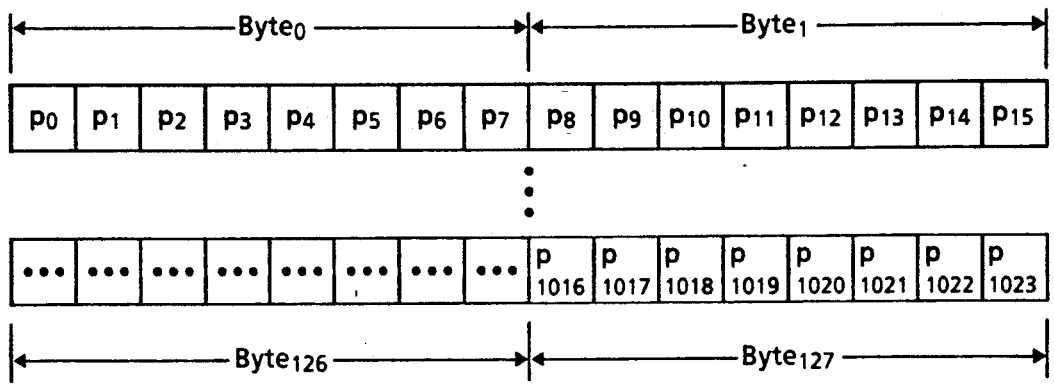
FIG. 22
FIG. 23

| Meta Code (from DL) | CD Code (mapped from FST) | Meaning | Followed by: | | Notes |
|---|---|---|---|---|---|
| | | | This # of bytes | These bytes mean: | |
| 6 | 10 | Absouute Scan | 2 | Next scan line | |
| 7 | 11 | Relative Scan | 2 | Offset to next scan line | |
| 10 | 12 | Dimension (DIM) | 2 | Replaces FS dimension value | |
| 11 | 13 | Portrait | 0 | | |
| 12 | 20 | Highlight Color Start (HCS) | 0 | | Used only in inks in conjuction with fill characters |
| 13 | 21 | Highlight Color End (HCE) | 0 | | Used only in inks in conjuction with fill characters |
| 14 | 20 | Highlight Color Start (HCS) | 0 | | |
| 15 | 21 | Highlight Color End (HCE) | 0 | | |
| 16 | 16 | Extended Dimension | 4 | Replaces FS dimension value | |
| 17 | 17 | Escape | n | Prefix for extended codes | |
| 2 | 1 | Landscape (LS) | 0 | | |
| 1 | 2 | End of Line (EOL) | 0 | | |
| 3 | 3 | Overlay | 0 | | |
| Many different codes (usually all otherwise unused meta codes below 40 and also unused character values within font. | 4 | Space | 0 | | Spacing value is taken form FSS word in FST. |

*FIG. 28A*

| Meta Code (from DL) | CD Code (mapped from FST) | Meaning | Followed by: This # of bytes | These bytes mean: | Notes |
|---|---|---|---|---|---|
| 4 | 1 | Abs Dot | 2 | Next dot address | |
| 5 | 6 | Rel Dot (RD) | 2 | Offset to dot address | |
| 0 | 7 | Font Switch (FS) | 1 | Font index | |
| 6 | 10 | Absolute Scan | 2 | Next scan line | |
| 7 | 11 | Relative Scan | 2 | Offset to next scan line | |
| 10 | 12 | Dimension (DIM) | 2 | Replaces FS dimension value | |
| 11 | 13 | Portrait | 0 | | |
| No Specific value | 14 | Graphic Space X | 0 | | Not used in any Xerox font |
| No Specific value | 15 | Graphic Space Y | 0 | | Not used in any Xerox font |
| 16 | 16 | Extended Dimension | 4 | Replaces FS dimendion value | |
| 17 | 17 | Escape | n | Prefix for extended codes | |
| 14 | 20 | Highlight Color Start (HCS) | 0 | | |
| 12 | 20 | Highlight Color Start (HCS) | 0 | | Used only in inks in conjunction with fill characters |
| 15 | 21 | Highlight Color End (HCE) | 0 | | |
| 13 | 21 | Highlight Color End (HCE) | 0 | | Used only in inks in conjunction with fill characters |

*FIG. 28B*

| Group | Character Codes (octal) |
|---|---|
| Meta - codes | 0 .. 17 |
| Black Fill Characters | 20 .. 207 |
| Color Fill Characters | 210 .. 377 |

| Relative* Character Code (octal) *see Table 2.4 for starting character codes | Data Width (dots) | Height (scans) | Usage |
|---|---|---|---|
| 0 | 32 | 32 | largeFillChar |
| 1 | 1 | 32 | leadingDotsChar(1) |
| : | : | 32 | : |
| 7 | 7 | 32 | leadingDotsChar(7) |
| 10 | 1 | 32 | trailingDotsChar(1) |
| : | : | 32 | : |
| 16 | 7 | 32 | trailingDotsChar(7) |
| 17 | 32 | 1 | leadingScansChar(1) |
| : | 32 | : | : |
| 25 | 32 | 7 | leadingScansChar(7) |
| 26 | 1 | 1 | leftCornerChar(1,1) |
| : | 1 | : | : |
| 34 | 1 | 7 | leftCornerChar(1,7) |
| 35 | 2 | 1 | leftCornerChar(2,1) |
| : | 2 | : | : |
| 43 | 2 | 7 | leftCornerChar(2,7) |
| 44 | 3 | 1 | leftCornerChar(3,1) |
| : | 3 | : | : |
| 52 | 3 | 7 | leftCornerChar(3,7) |
| 53 | 4 | 1 | leftCornerChar(4,1) |
| : | 4 | : | : |
| 61 | 4 | 7 | leftCornerChar(4,7) |
| 62 | 5 | 1 | leftCornerChar(5,1) |
| : | 5 | : | : |
| 70 | 5 | 7 | leftCornerChar(5,7) |
| 71 | 6 | 1 | leftCornerChar(6,1) |

*FIG. 31A*

| Relative* Character Code (octal) *see Table 2.4 for starting character codes | Data Width (dots) | Height (scans) | Usage |
|---|---|---|---|
| : | 6 | : | : |
| 77 | 6 | 7 | leftCornerChar(6,7) |
| 100 | 7 | 1 | leftCornerChar(7,1) |
| : | 7 | : | : |
| 106 | 7 | 7 | leftCornerChar(7,7) |
| 107 | 1 | 1 | rightCornerChar(1,1) |
| : | 1 | : | : |
| 115 | 1 | 7 | rightCornerChar(1,7) |
| 116 | 2 | 1 | rightCornerChar(2,1) |
| : | 2 | : | : |
| 124 | 2 | 7 | rightCornerChar(2,7) |
| 125 | 3 | 1 | rightCornerChar(3,1) |
| : | 3 | : | : |
| 133 | 3 | 7 | rightCornerChar(3,7) |
| 134 | 4 | 1 | rightCornerChar(4,1) |
| : | 4 | : | : |
| 142 | 4 | 7 | rightCornerChar(4,7) |
| 143 | 5 | 1 | rightCornerChar(5,1) |
| : | 5 | : | : |
| 151 | 5 | 7 | rightCornerChar(5,7) |
| 152 | 6 | 1 | rightCornerChar(6,1) |
| : | 6 | : | : |
| 160 | 6 | 7 | rightCornerChar(6,7) |
| 161 | 7 | 1 | rightCornerChar(6,1) |
| : | 7 | : | : |
| 167 | 7 | 7 | rightCornerChar(7,7) |

*FIG. 32*

| Character Type | Quality (inkSize = 8x8) | |
|---|---|---|
| | Calculation | # |
| largeFill | 1 | 1 |
| leadingDots | inkSizeX-1 | 7 |
| trailingDots | inkSizeX-1 | 7 |
| leadingScans | inkSizeY-1 | 7 |
| leftCorner | (inkSizeX-1)*(inkSizeY-1) | 49 |
| rightCorner | (inkSizeX-1)*(inkSizeY-1) | 49 |
| Total per primary | 2*inkSizeX*inkSizeY-inkSizeY | 120 |
| Total per ink | totalPerPrimary*2 | 240 |

*FIG. 33*

| Character Type | Width (bits) | Height (scans) | Size (Kbits) |
|---|---|---|---|
| largeFill | 32 | 32 | 1.0 |
| leadingDots | 16 | 32 | 3.5 |
| trailingDots | 16 | 32 | 3.5 |
| leadingScans* | 32 | 1..inkSizeY-1 | - |
| leftCorner | 16 | 1..inkSizeY-1 | - |
| rightCorner | 16 | 1..inkSizeY-1 | - |
| Total per primary | - | - | 8.0 |
| Total per ink | - | - | 16.0 |

*FIG. 34*

| Relative Character Code | Data Width (dots) | Height (scans) | Usage |
|---|---|---|---|
| 0 | inkSizeX | inkSizeY | largeFillChar |
| 1 | 1 | inkSizeY | trailingDotsChar(1) |
| : | : | inkSizeY | : |
| inkSizeX-1 | inkSizeX-1 | inkSizeY | trailingDotsChar(inkSizeX-1) |

*FIG. 36*

| Character Type | Quantity | | | |
|---|---|---|---|---|
| | inkSizeX x inkSizeY | 32 x 32 | 150 x 150 | 240 x 240 |
| largeFill | 1 | 1 | 1 | 1 |
| trailingDots | inkSizeX-1 | 31 | 149 | 239 |
| Total | inkSizeX | 32 | 150 | 240 |
| Inks per font | 240 / (2*inkSizeX) | 3 | < 1 | < 1 |

*FIG. 37*

| Character Type | Width (bits) | Size (Kbits) | | |
|---|---|---|---|---|
| | | 32 x 32 | 150 x 150 | 240 x 240 |
| largeFill | - | 1.0 | 22.8 | 57.6 |
| trailingDots | 8 | 7.9 | 178.8 | 458.9 |
| Total per primary | - | 8.9 | 201.6 | 516.5 |
| Total per ink | - | 17.8 | 403.2 | 1033.0 |

*FIG. 38*

| | |
|---|---|
| ... | |
| LS(2) | HCE($13_8$) |
| $45_8$ | $126_8$ |
| y = 7* | DIM[$10_8$] |
| $45_8$ | x = 63.* |
| -520.(lbs) | RD[5] |
| $207_8$ | -520(msb) |
| -1542.(lbs) | RD[5] |
| HCS($12_8$) | -1542.(mbs) |
| $235_8$ | $316_8$ |
| y = 7* | DIM[$10_8$] |
| $235_8$ | x = 63.* |
| -520.(lbs) | RD[5] |
| $377_8$ | -520(msb) |
| HCE($13_8$) | EOL[1] |
| $27_8$ | LS(2) |
| DIM[$10_8$] | $20_8$ |
| x = 63.* | y = 32.* |
| RD[5] | $20_8$ |
| -520. | |
| RD[5] | $36_8$ |
| -1542. | |
| $217_8$ | HCS($12_8$) |
| DIM[$10_8$] | $210_8$ |
| x = 63.* | y = 32.* |
| RD[5] | $210_8$ |
| -520. | |
| EOL[1] | $226_8$ |
| LS(2) | HCE($13_8$) |
| y = 7* | DIM[$10_8$] |
| $27_8$ | x = 2* |
| y = 7* | DIM[$10_8$] |
| $20_8$ | x = 128.* |

| | |
|---|---|
| y = 7* | DIM[$10_8$] |
| $20_8$ | x = 63.* |
| -520.(lbs) | RD[5] |
| DIM[$10_8$] | -520(msb) |
| x = 2* | y = 7* |
| RD[5] | $36_8$ |
| -1542. | |
| DIM[$10_8$] | HCS($12_8$) |
| x = 2* | y = 7* |
| DIM[$10_8$] | $217_8$ |
| x = 128.* | y = 7* |
| DIM[$10_8$] | $210_8$ |
| x = 63.* | y = 7* |
| RD[5] | $210_8$ |
| -520. | |
| y = 7* | DIM[$10_8$] |
| $226_8$ | x = 2* |
| | EOL[1] |
| Scan Line Address = 944. | |
| DL offset | |
| font index = x | |
| Dot Address = 817. | |
| Scan Line Address = 912. | |
| DL offset | |
| font index = ink | |
| Dot Address = 817. | |
| Scan Line Address = 880. | |
| DL offset | |
| font index = x | |
| Dot Address = 817. | |
| Scan Line Address = 848. | |
| DL offset | |
| font index = x | |
| Dot Address = 817. | |
| Scan Line Address = 841. | |
| DL offset | |
| font index = x | |
| Dot Address = 817. |

*FIG. 39*

| opt. - no. of items | type 1 |

FIG. 42

| opt. - no. of items | type 1 |
| RAD50 filename ||

FIG. 43

| opt. - no. of items | type 2 |
| RAD 50 filename ||
| ID number ||

FIG. 44

| opt. - no. of items | type 3 |
| RAD50 filename ||

FIG. 45

| opt. - no. of items | type 4 |
|---|---|
| RAD 50 filename ||
| length ||
| ⋮ ||

FIG. 46

| opt. - no. of items | type 4A |
|---|---|
| flagword ||

FIG. 47

| opt. - no. of items | type 4B |
|---|---|
| RAD 50 filename ||

FIG. 48

| opt. - no. of items | type 4C |
|---|---|
| length ||

| RAD 50 filename |
|---|
| • |
| • |
| • |

FIG. 49

| opt. - no. of items | type 4D |
|---|---|
| length ||

| number |
|---|
| • |
| • |
| • |

FIG. 50

| opt. - no. of items | type 5 |
|---|---|
| length ||

| |
|---|
| • |
| • |
| • |

FIG. 51

| opt. - no. of items | type 6 |
|---|---|
| RAD50 filename ||

FIG. 52

| opt. - no. of items | type 7 |
|---|---|
| length ||
| • • • ||

FIG. 53

| opt. - no. of items | type 7A |
|---|---|
| length ||
| number ||
| • • • ||

FIG. 54

| opt. - no. of items | type 7B |
|---|---|
| number ||
| number ||

FIG. 55

| opt. - no. of items | type 7C |
|---|---|
| flagword ||

FIG. 56

| opt. - no. of items | type 7D |
|---|---|
| RAD 50 filename ||

FIG. 57

| opt. - no. of items | type 7E |
|---|---|
| length ||
| index ||
| • |
| • |
| • |

FIG. 58

| opt. - no. of items | type 8 |
|---|---|
| length ||
| • • • ||

FIG. 59

| opt. - no. of items | type 9 |
|---|---|
| RAD 50 filename ||
| length ||
| • • • ||

FIG. 60

| opt. - no. of items | type 9A |
|---|---|
| length ||
| RAD 50 filename ||
| • • • ||

FIG. 61

| opt. - no. of items | type 9B |
|---|---|
| length ||
| RAD 50 filename ||
| • • • ||

FIG. 62

| opt. - no. of items | type 10 |
|---|---|
| RAD 50 filename ||
| length ||
| • • • ||

FIG. 63

| opt. - no. of items | type 11 |
|---|---|
| length ||
| ⋮ ||

FIG. 64

| opt. - no. of items | type 12 |
|---|---|

FIG. 65

INK CATALOG FOR A TWO COLOR PRINTER

BACKGROUND

A printing system for printing using two colorants, black plus a highlight color, and more specifically a printing system which has stored in memory a number of ink fonts, each of these fonts a different shade of highlight color, the members of each font being a large number of shapes which can be assembled to form rectangles of any size from which the highlight areas can be assembled.

To add highlight color to a typical black and white print, a xerographic printer can be designed with a tri-level development process. The photoconductor is charged in the form of an image where some areas are charged positively and some areas are charged negatively relative to non-image areas. Then, by using black toner with a positive potential and color toner with a negative potential, both black text and colored highlight areas can be printed on the same print in one pass. These highlight areas can be regular shapes such as a colored borders or highlighted areas of the page, or more complex shapes such as a rough approximations of flowers, or other figures.

The highlight colorant is typically red, green or blue. Then, the printer, at any given moment, will have black toner and one toner of one of these three colors. It is left to the user to load any color, and to change to another color at any time by removing the original toner cartridge and inserting another.

Toners are usually applied to paper to achieve variations of density by halftoning. In this embodiment, the halftone matrix will be assumed to be 8 by 8 pixels, each pixel being either white, black or colored. The resultant variations with red highlight and black toner can vary from white, light pink and light gray to red or black, and to any mixture of these.

Most printers typically print characters, and therefore the hardware is optimized for the storage, accessing and printing of alphabetical or numerical character bit maps. Substituting a tri-level development process, it would be relatively simple to print text in black or in a high light color. However, the requirement for producing arbitrary shapes in varying shades of color would complicate the hardware and software and impact run time. When the printer receives an instruction to print a specified color in a specified shape, it must define the area in the page bit map, produce a halftoned tile in the desired color, and then load the area with these tiles, all before printing can start. Clearly, this will impact unit cost and run time. What would be an improvement would be a printing system where arbitrary shapes and colors can be printed with equipment that was originally optimized to print text.

SUMMARY OF THE INVENTION

This invention is a printing system in which a variety of colors and shapes are created and stored in the system as though they were fonts. The characteristics of a font that vary within the font are the overall area and shape of the characters ("W" is larger and shaped differently from "i") and the placement of the pixels within the area (the pixels of an "x" are placed differently form the pixels of an "o"). The color of the characters within the font normally do not change. They are assumed to be pure black or pure white. A typical printer is then set up to handle a large number of fonts (bold, italics, 10 point, 12 point, etc) which vary slightly from one another in at least one characteristic.

This invention applies the same philosophy to colors and shapes. Each font is a set of shapes (squares and rectangles of various sizes) which all have the same color, and which can be used to assemble an area of any rectangular size. In this disclosed embodiment, there are 120 possible shapes, all of which are filled with a pixel pattern to produce the same color. Since the color is applied in bit patterns, there will be a patterns of pixels in an 8×8 pixel bit map or pattern to define the density of the color. However, since this is a two color system, with each color being independent of the other, there must be two pixel bit maps or patterns, one for black and one for the color. Each pixel bit map is one font character. There are 120 font characters for black and another 120 corresponding font characters for color. These font characters reside within a font file and can be loaded into a character dispatcher since they are now in a form that a text based imager can operate on directly.

The same philosophy can be used for a full color printer. For example, four inks can be loaded into a four pass printer, typically cyan, magenta, yellow and black. Four fonts will then be required, one for each primary color, to produce the final print in any one color, and four hundred fonts will be needed to allow the user to choose between 100 colors.

In an actual printing system there will be a large number of palettes in each "catalog", and a number of catalogs within the printer.

BRIEF DESCRIPTION OF THE DRAWINGS

FIG. 10 is a directory of screen definitions.
FIG. 11 is a screen definition.
FIG. 12 is a pattern definition.
FIG. 15 is a large fill character.
FIG. 16 is a 7×32 leading dots character.
FIG. 17 is a 3×2 leading dots character.
FIG. 18 is a 7×7 left corner character.
FIG. 19 is a 32×7 leading scans character.
FIG. 20 is a 7×32 trailing dots character.
FIG. 21 is a 7×7 right corner character.
FIG. 22 is a 32×32 Mask.
FIG. 23 is a 32×32 mask per Interpress standard (a byte stream).

FIGS. 28A, 28B and 28C are CD Meta Codes and CD Codes (sorted by Meta Code).

FIGS. 31A and 32 show the color ink character code assignments.

FIG. 33 shows the number of character codes required for color inks.

FIG. 34 shows color ink size.

FIG. 36 is the texture ink fill character code assignments.

FIG. 37 is the number of character codes required for texture inks.

FIG. 38 is the texture ink size.

FIG. 39 is an example of a box fill TL/DL.

FIG. 42 shows the composition of Notype structure.D.

FIG. 43 shows the composition of ICATALOG structure.D.

FIG. 44 shows the composition of PRIMARY structure.D.

FIG. 45 shows the composition of PALLETTE structure.D.

FIG. 46 shows the composition of COLOR Sub-Option.D.

FIG. 47 shows the composition of Model Sub-Option.D.

FIG. 48 shows the composition of Scnset Sub-Option.D.

FIG. 49 shows the composition of Primary Sub-Option.D.

FIG. 50 shows the composition of Values Sub-Option.D.

FIG. 51 shows the composition of Copts structure.D.

FIG. 52 shows the composition of Scanset structure.D.

FIG. 53 shows the composition of Screen structure.D.

FIG. 54 shows the composition of Data Sub-Option structure.D.

FIG. 55 shows the composition of Size Sub-Option structure.D.

FIG. 56 shows the composition of Dtype Sub-Option structure.D.

FIG. 57 shows the composition of Plib Sub-Option structure.D.

FIG. 58 shows the composition of Pindex Sub-Option structure.D

FIG. 59 shows the composition of SOPTS structure.D.

FIG. 60 shows the composition of TEXTURE structure.D.

FIG. 61 shows the composition of Pattern Sub-Option structure.D.

FIG. 62 shows the composition of Ink Sub-Option structure.D.

FIG. 63 shows the composition of PATTERN structure.D.

FIG. 64 shows the composition of POPTS structure.D.

FIG. 65 shows the composition of END structure.D.

DETAILED DESCRIPTION OF THE INVENTION

The preferred embodiment will now be described in detail.

Figure 1:
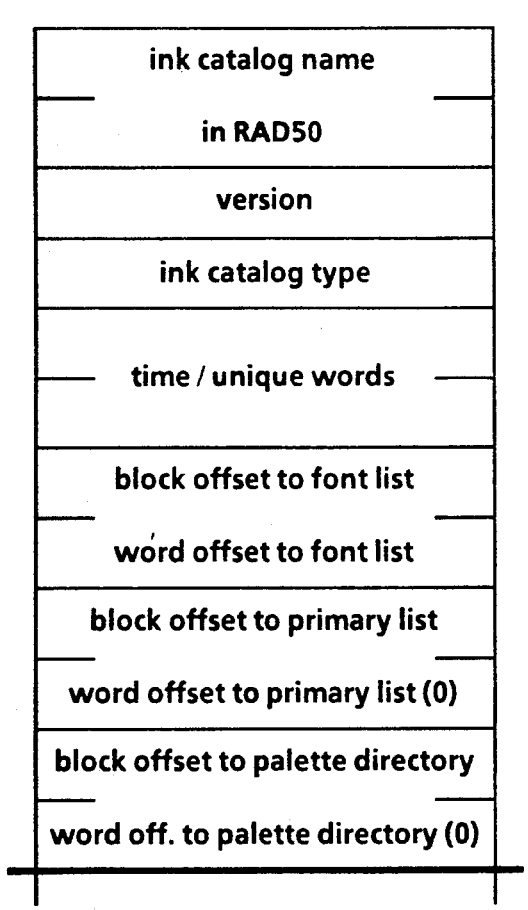
FIG. 1 is an Ink Catalog Header.

FIG. 1 shows the arrangement of 13 words of data in the header of the catalog. The first three words in the header block contain the ink catalog name and file type in RAD50. The version of this Ink Catalog is the version number, for example, 1. The Ink Catalog Type is: 1—Monochrome, 2—Highlight, and 3—Full Color. For this embodiment, the type will be 2.

The two time/unique words are a unique field within the header block. For example, this will contain the date and time of compilation. The following six words contain the block and word offsets which point to the start of the list of fonts, the list of primaries, and the start of the palette directory.

The header portion of the ink catalog was designed to include key pieces of information. Such information includes three words which contain the name of the ink catalog plus the file type in Radix 50 format so that any referencing task could verify that this is indeed the correct ink catalog file that it needs. Next, a version word was added so that if the structure of an ink catalog changed, it could be easily checked by this version word. Next, an ink catalog type word was added to show which target machine this ink catalog was built for. Next, two words in the header contain unique words for each ink catalog. The time/unique words were added so that the task could specify the exact ink catalog it used during compilation to create a form. Input could then verify that the current ink catalog that resides on the disk is indeed the correct one. The next six words which are the block and word offsets pointing to the list of fonts, the list of primaries, and the palette directory were added so that the header may expand should there be a need to include additional information. The word offsets for the primary list and the palette directory are zero since these begin on a block boundary. All block and word offsets in this ink catalog structure are relative to the beginning of the ink catalog. Also, all reserved words will be zero. Immediately following the header is the list of fonts used in this ink catalog.

Figure 2:
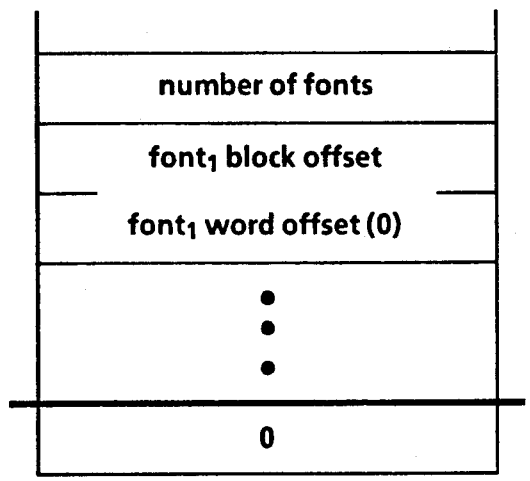
FIG. 2 is a font list.

FIG. 2 is a font list. The number of fonts is the number the Ink Compiler has built within this ink catalog. The Font block and word offsets are two words that point to an area within this ink catalog that has the user defined screens and inks in a font file format. The end of the font list is padded with zeros until a block boundary is reached.

The font list follows immediately after the ink catalog header and is variable in length. First, the number of fonts is specified, followed by the blocks and word offsets that point to the area within this ink catalog that contains the user defined screens, colors, and textures for this ink catalog in a font file format. The font word offset is zero since the font data always begins on a block boundary. These fonts are accessed by the character reference word specified in a screen, color, or texture definition structure. If the list of fonts does not end exactly on a block boundary, there will be padding with zeroes until the next block boundary.

Figure 3:
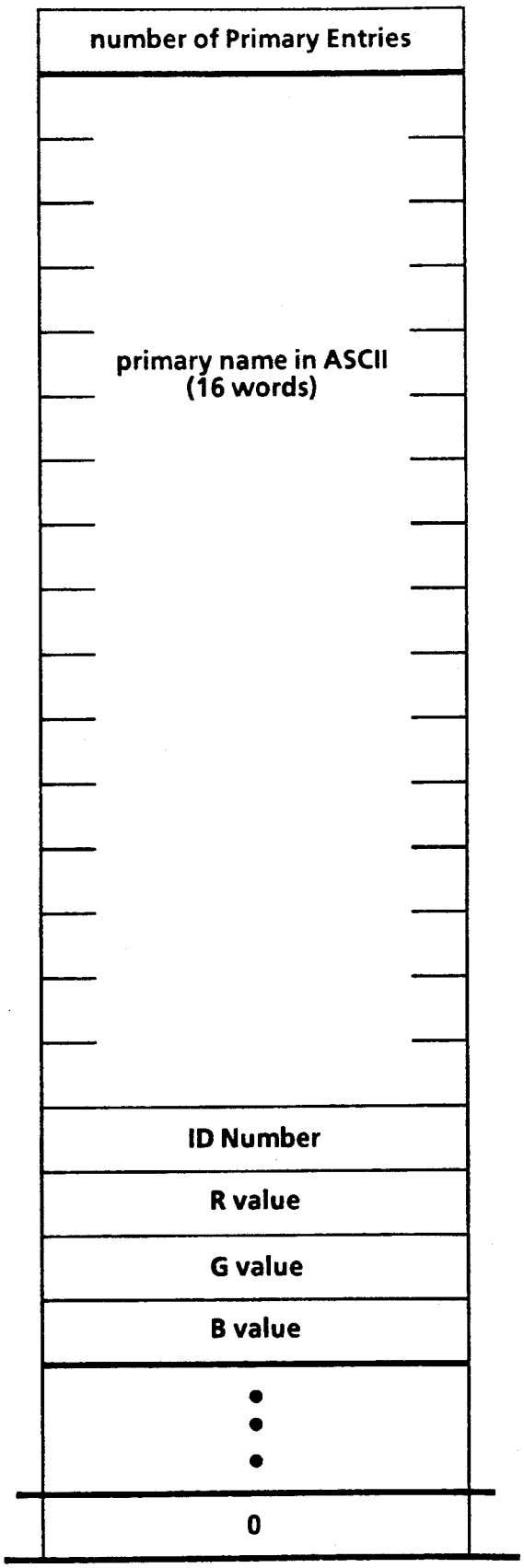
FIG. 3 is a list of primaries.

FIG. 3 is a list of Primary colors. The Primary List begins with the number of Primary Entries. The Primary Entries are twenty words each. Sixteen words contain the primary name in ASCII, one word contains the primary's ID number, and three words contain the color coordinates. The three RGB value words are the color coordinates (RGB model) for this primary. Each is scaled by a factor of 10000 and expressed as an integer. The end of the Primary List is padded with zeroes until a block boundary.

The primary list begins on a block boundary for fewer disk accesses. The list of primaries starts with a word containing the number of primary entries. Each primary entry is a fixed length of twenty words. The first sixteen words contain a primary name which can be up to thirty-two ASCII characters. Should the primary name length utilize less then thirty-two characters, then the rest of the space will be filled with zeroes. Following the name will be the primary's ID number and the three color coordinates. The color coordinates are scaled by ten thousand and expressed here as integers. If the list of primaries does not end exactly on a block boundary, there will be padding with zeroes until the next block boundary. The list of primaries is not expected to be large. All entries in the primary list are in alphabetical order using the primary name. By having a fixed length entry and all entries in alphabetical order, a binary search may be done to quickly find a particular primary.

Figure 4:
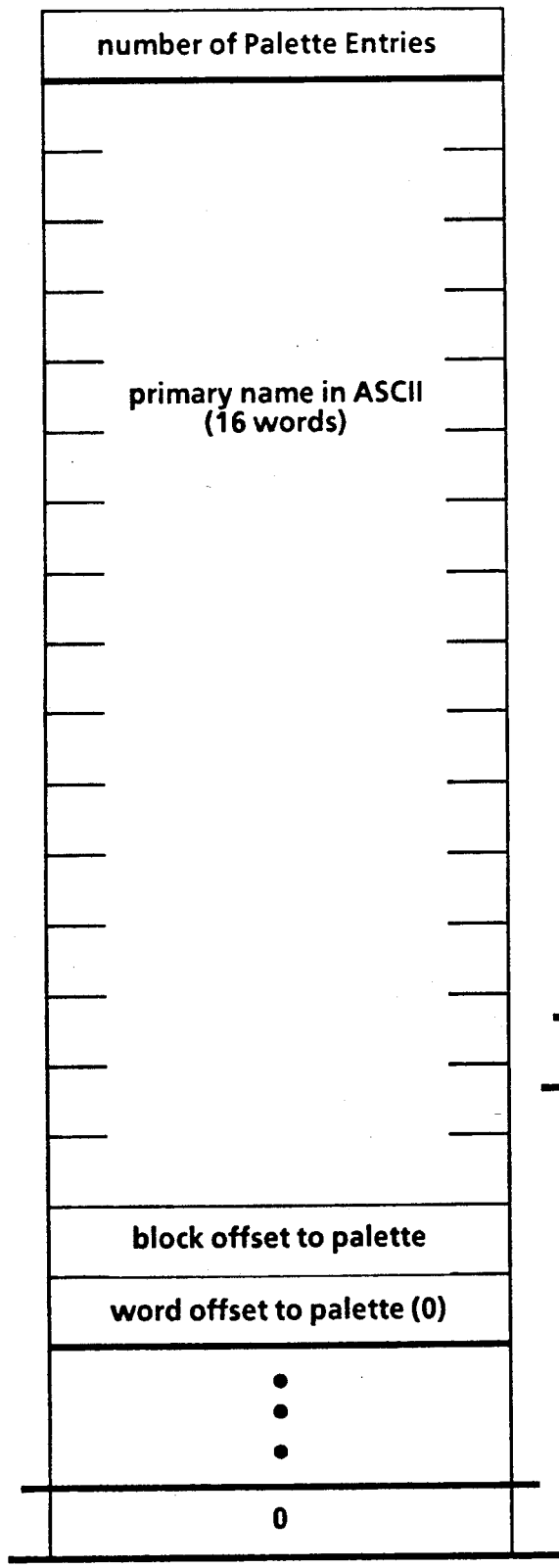
FIG. 4 is a palette directory.

FIG. 4 is the Pallette Directory. The first line is a list of all the palettes in the ink catalog. First is the number of Palette Entries. Then the Palette Entries follow. The Palette Entries are eighteen words long. Sixteen words contain the palette name in ASCII and the following two words contain the block and word offsets to the palette definition. At the end of the first pallette entry, other Palette Entries may follow. The end is padded with zeroes until a block boundary The palette directory begins on a block boundary. This is for fewer disk accesses. The palette directory starts with a word containing the number of palette entries. Each palette entry is a fixed length of eighteen words. The first sixteen words hold the palette name that could be up to thirty-two. ASCII characters. Should the palette name length utilize less then thirty-two characters, then the rest of the space will be filled with zeroes. The block and word offsets point to the exact location for this palette definition. The word offset is zero since a palette definition always begins on a block boundary. If the palette directory does not end exactly on a block boundary, there will be padding with zeroes until the next block boundary.

Using the palette name, all entries in the palette directory are in alphabetical order. By having a fixed length entry and all entries in alphabetical order, a binary search may be done to quickly find a particular palette.

The following structures define a palette structure. There may be multiple palette structures within an ink catalog.

There may exist a Default palette which is created by the Ink Compiler. The contents of it are all the global screens and patterns that the user may have defined priori to the first Palette command. The Default palette is not to be confused with a user specified palette defined using the Palette command.

Figure 5:
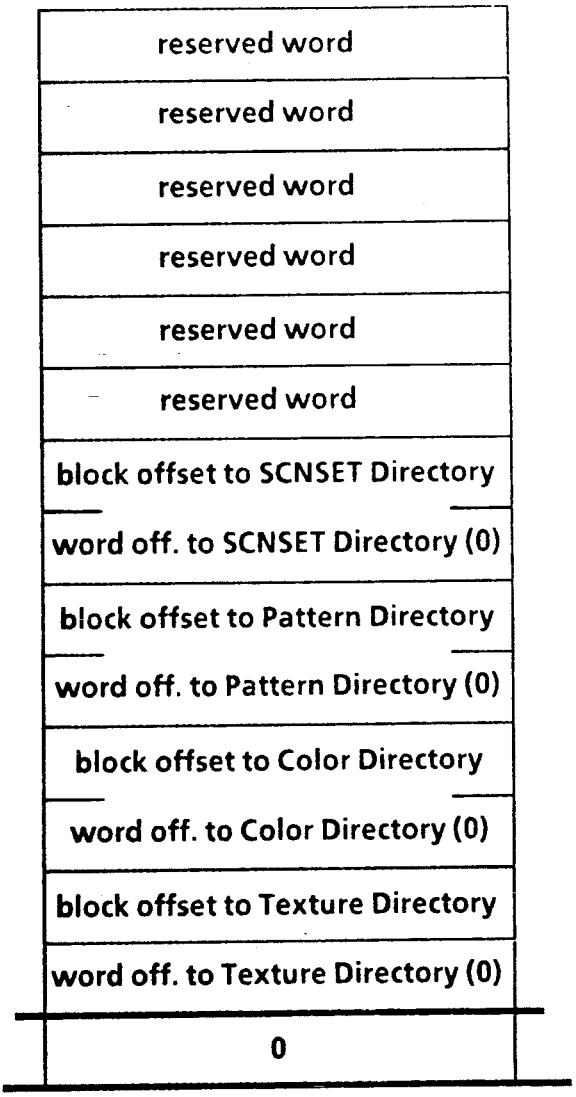
FIG. 5 is a palette header.

FIG. 5 is the Palette structure. The first six words are reserved in case there is a need for the palette header to hold additional information. The next eight words are the block and word offsets to the SCNSET, pattern, color, and texture directories. The end is padded with zeroes until a block boundary.

The palette structure header begins on a block boundary. This is for fewer disk accesses. It is a fixed length of fourteen words. Within the palette header, there are six reserved words in case there is a need for the palette header to hold additional information. The next two words are the block and word offsets which point to the beginning of the linked and sorted colors definitions. The next eight words are the block and word offsets to the screen set, pattern, color, and texture directories. Because the directories always begin on a block boundary, the word offsets are zero. After a palette header there will be padding with zeroes until the next block boundary so that the SCNSET directory that follows will begin on a block boundary.

Figures 6, 7:
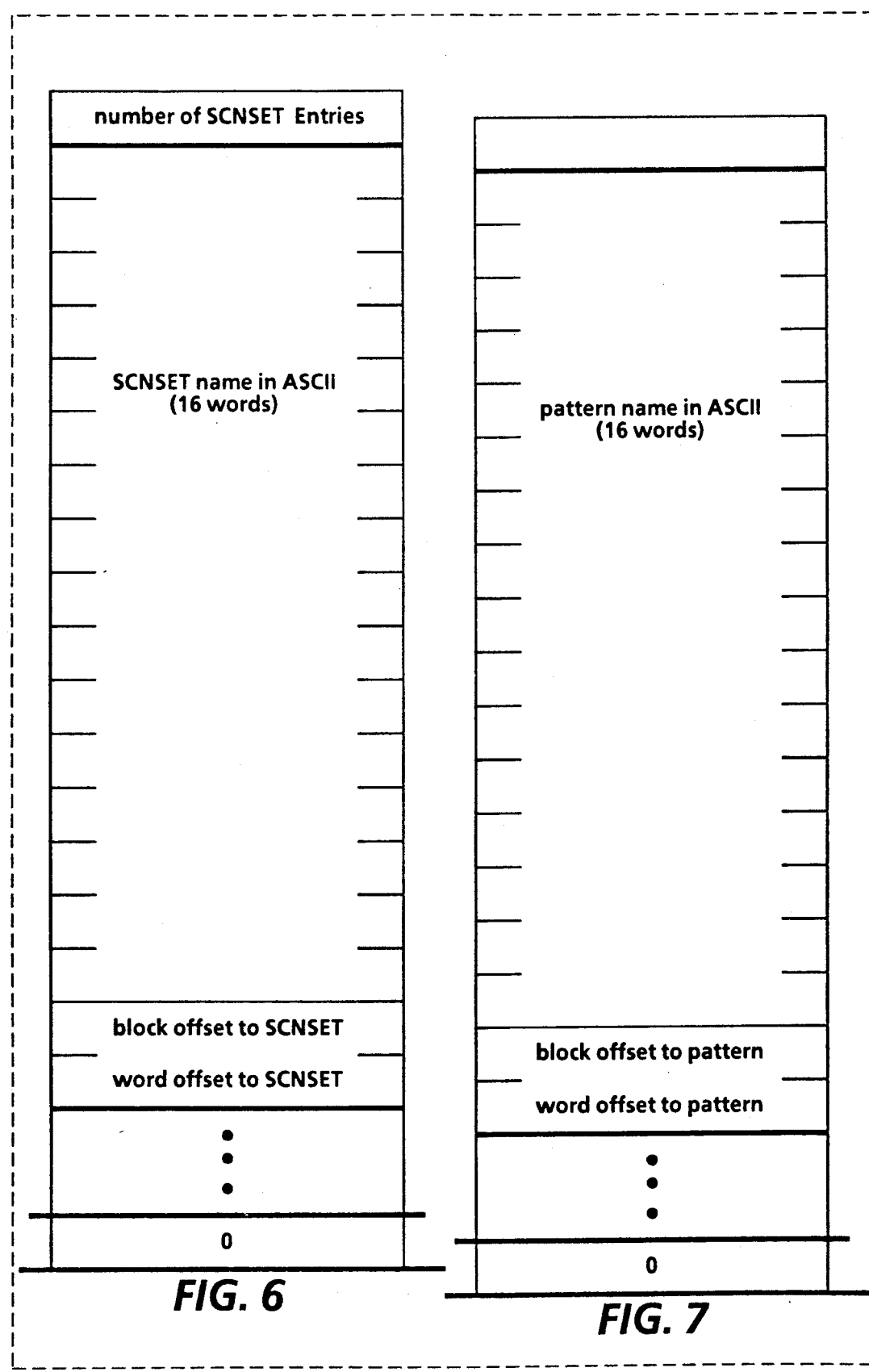
FIG. 6 is a screen set directory.
FIG. 7 is a pattern directory.

FIG. 6 is the SCNSET Directory. First is a list of all the SCNSETs within this palette. First is the number of SCNSET Entries. Then the SCNSET Entries follow. Each SCNSET Entry is eighteen words which consists of the SCNSET name in ASCII and then two words that contain the block and word offsets to the SCNSET definition. All SCNSET Entries are in alphabetical order. Other SCNSET Entries may follow. The end is padded with zeros until a block boundary.

The screen set (SCNSET) directory begins on a block boundary. This is for fewer disk accesses. Each entry is a fixed length of eighteen words. The first sixteen words hold the screen set name that can be up to thirty-two ASCII characters. Should the screen set name utilize less then thirty-two characters, then the rest of the space will be filled with zeroes. The block and word offsets point to the exact location of the screen set definition. If the screen set directory does not end exactly on a block boundary, there will be padding with zeroes until the next block boundary.

Using the screen set name, all entries in the screen set directory are in alphabetical order. By having a fixed length entry and all entries in alphabetical order, a binary search may be done to quickly find a particular screen set.

FIG. 7 is the Pattern Directory. The number of Pattern Entries is a list of all the patterns within this palette. First is the number of Pattern Entries. Then the Pattern Entries follow. Each Pattern Entry is eighteen words which consists of the pattern name in ASCII and then two words that contain the block and word offsets to the pattern definition. All Pattern Entries are in alphabetical order. Other Pattern Entries may follow. The end is padded with zeroes until a block boundary.

The pattern directory begins on a block boundary. This is for fewer disk accesses. Each entry is a fixed length of eighteen words. The first sixteen words hold the pattern name that can be up to thirty-two ASCII characters. Should the pattern name utilize less then thirty-two characters, then the rest of the space will be filled with zeroes. The block and word offsets point to the exact location of the pattern definition. If the pattern directory does not end exactly on a block boundary, there will be padding with zeroes until the next block boundary.

Using the pattern name, all entries in the pattern directory are in alphabetical order. By having a fixed length entry and all entries in alphabetical order, a binary search may be done to quickly find a particular pattern.

Figure 8:
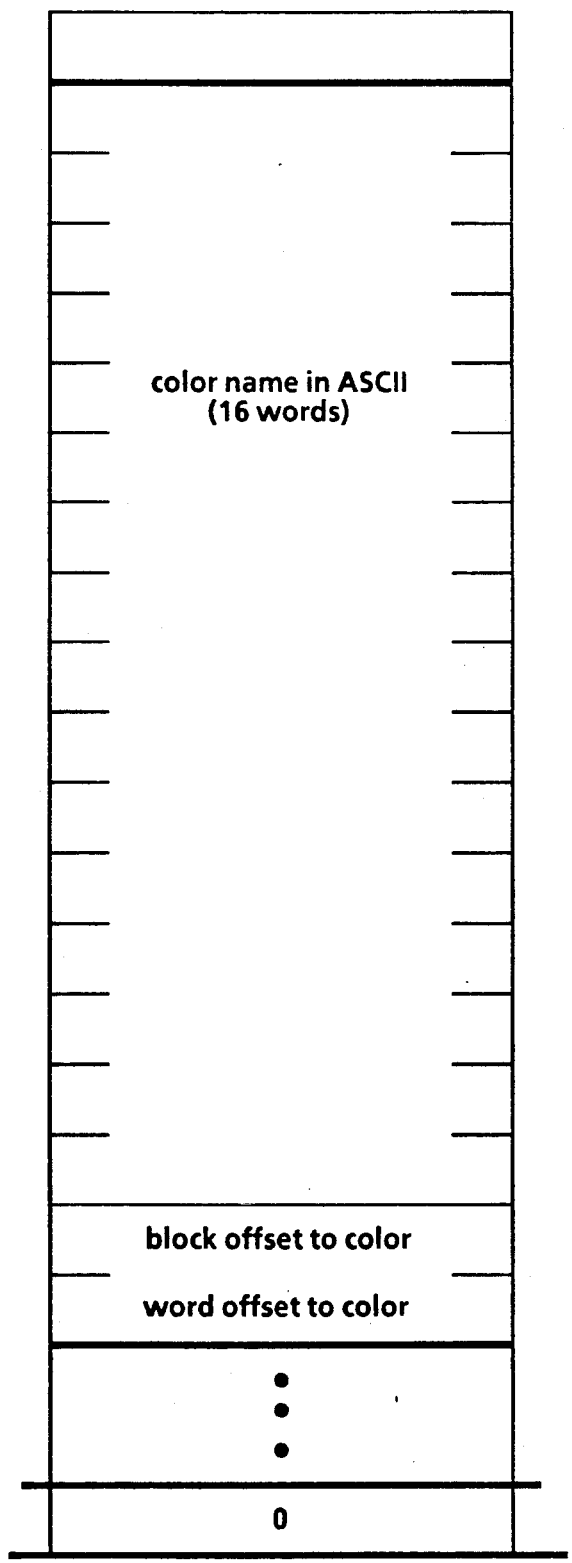
FIG. 8 is a color directory.

FIG. 8 is the color directory. The number of Color Entries is a list of all the colors within this palette. First is the number of Colors Entries. Then the Color Entries follow. Each Color Entry is eighteen words which consists of the color name in ASCII and then two words that contain the block and word offsets to the color definition. All color entries are in alphabetical order. Other Color Entries may follow. The end is padded with zeroes until a block boundary.

The color directory begins on a block boundary. This is for fewer disk accesses. Each entry is a fixed length of eighteen words. The first sixteen words hold the color name that can be up to thirty-two ASCII characters. Should the color name utilize less then thirty-two characters, then the rest of the space will be filled with zeroes. The block and word offsets point to the exact location of the color definition. If the color directory does not end exactly on a block boundary, there will be padding with zeroes until the next block boundary.

Using the color name, all entries in the color directory are in alphabetical order. By having a fixed length entry and all entries in alphabetical order, a binary search may be done to quickly find a particular color.

Figure 9:
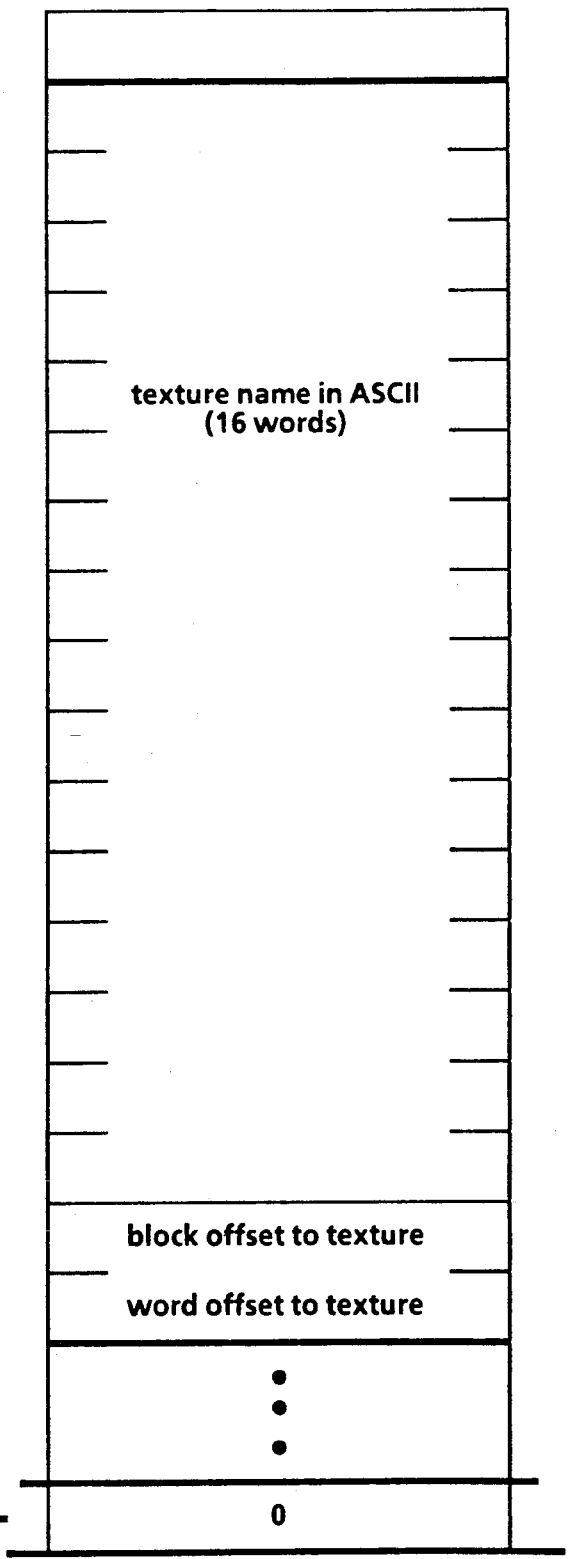
FIG. 9 is a texture directory.

FIG. 9 is a Texture Directory. The number of Texture Entries is a list of all the textures within this palette. First is the number of Texture Entries. Then the Texture Entries follow. Each Texture Entry is eighteen words which consists of the texture name in ASCII and then two words that contain the block and word offsets to the texture definition. All Texture Entries are in alphabetical order. Other Texture Entries may follow. The end is padded with zeroes until a block boundary.

The texture directory begins on a block boundary. This is for fewer disk accesses. Each entry is a fixed length of eighteen words. The first sixteen words hold the texture name that can be up to thirty-two ASCII characters. Should the texture name utilize less then thirty-two characters, then the rest of the space will be filled with zeroes. The block and word offsets point to the exact location of the texture definition. If the texture directory does not end exactly on a block boundary, there will be padding with zeroes until the next block boundary.

Using the texture name, all entries in the texture directory are in alphabetical order. By having a fixed length entry and all entries in alphabetical order, a binary search may be done to quickly find a particular texture.

Next are the SCNSET, pattern, color, and texture definitions. To allow for fewer disk accesses, all SCNSET definitions will begin on a block boundary. All pattern, color, and texture definitions less then 512 bytes will be stored in a block (none will span over two blocks). If there is insufficient amount of space available in a block to fit a pattern, color, or texture definition, then zeroes will pad to the block boundary and the definition will begin at the next block. All pattern, color, and texture definitions greater than 512 bytes will begin on a block boundary and may span multiple blocks.

FIG. 10 is the SCNSET Definition. The number of SCNSET Definitions is the number of SCREEN Definitions that are in this SCNSET Definition. The maximum distance is calculated using $value_b$ and $value_h$ of each screen. $Value_b$ is the percentage of black and $value_h$ is the percentage of highlight color for this screen. The block offset points to the screen definition. Other SCREEN Directory Entries may follow.

FIG. 11 is a SCREEN Definition. There are two character reference words used to locate the black and the highlight bitmaps for this screen. Each character reference word holds the font index which is the index into the list of fonts at the beginning of the ink catalog. The character codes for the black bitmaps begin at 16. and the character codes for the highlight bitmaps begin at 136. The $size_N$ and $size_M$ values are the N columns by M rows for the bitmaps that follow. Although the bitmaps for this screen are defined in a font as specified by the character references, they are also defined here in the Screen definition. The length of the bitmap is given in words and is the same for all the following bitmaps. Other Screen Definitions may follow. This is the end of the SCNSET Definition. Other SCNSET Definitions may follow.

A screen set (SCNSET) definition will always begin on a block boundary to allow for fewer disk accesses. It is not necessary for screen set definitions to be stored in any specific order since they can be searched using the SCNSET directory. The first word of a screen set definition contains the number of screen definitions that are included in this screen set definition. The next word contains the maximum distance calculated for the screens in this screen set. The maximum distance is the largest minimum distance where a minimum distance is calculated by taking a screen in the screen set and finding all the distances to every other screen in the screen set. After all the distances are calculated for a single screen, the smallest of these distances is considered a minimum distance. Distance is $(value_{b1} - value_{b0})^2 + (value_{h1} - value_{h0})^2$. A screen set definition contains a screen directory which is made up of screen directory entries. There is a screen directory entry for every screen definition within the screen set. This directory will facilitate searching for a particular screen in a screen set.

A screen directory entry is a fixed length of ten words. It begins with two words that are the percentages of block ($value_b$) and highlight color ($value_h$). Two reserved words were added for the full color implementation of the ink catalog so that a total of four values may be specified. Next, there are the block and word offsets which point to the actual screen definition. Thus, all the screens in a screen set have a screen directory entry that points to the actual screen definitions.

Screen directory entries are sorted by values beginning from lowest to highest $value_b$'s. Should there be identical $value_b$'s, then those entries will be from lowest to highest $value_h$'s. The screen directory entries are sorted to aid in searching for a particular screen definition. Searching will be done by values. If a certain screen does not exist within a screen set, the closest screen can be found using the maximum distance.

A screen definition is variable length. It begins with two words that contain character reference$_b$ and character reference$_h$. Character reference words are used to locate the black and the highlight bitmaps defined for this screen. Each character reference word represents the font index which is the index into the list of fonts at the beginning of the ink catalog. The character codes for the black bitmaps begin at 16, and the character codes for the highlight bitmaps begin at 136. A zero character reference indicates that there is no font for this screen. The two reserved words that follow will be used in the full color ink catalog for additional character references. Next, there are the $size_N$ and $size_M$ values which show the number of columns (bits) and rows (words), respectively, for the bitmaps that will follow. The range of $size_N$ is 1 to $2^{10}$ and the range of $size_M$ is 1 to $2^{10}$. Next, there are two variable length bitmaps. The length of the bitmap specified is the length of a single bitmap and all the bitmaps that may follow are the same size. The number of bitmaps signifies the number of bitmaps that will follow. Bitmap$_b$ is for black and bitmap$_h$ is for highlight color. For future ink catalogs for full color, more bitmaps may follow bitmap$_h$. Although the bitmaps are defined in a font as specified by the character references for use in line/meta mode, they are also defined here for use in interpress mode. FIG. 12 is the pattern definition. It was decided that fonts would not be built for patterns thus the use of a character reference word was unnecessary. In its place, there is provided a reserved word which is equal to zero.

The size$_N$ and size$_M$ values are the N columns by M rows of the bitmap that follows. Although the pattern is defined in the above specified font, it is also defined here in the Pattern definition. The length of the bitmap is given in words. This in the end of Pattern Definition. Other pattern Definitions may follow.

A pattern definition may begin on a block boundary to allow for fewer disk accesses. Included in a pattern definition are a reserved word (0), size$_N$, size$_M$, and a bitmap. See the screen definition for the details regarding these terms.

It is not necessary for pattern definitions to be stored in any specific order. They can be searched using the pattern directory.

Figure 13:
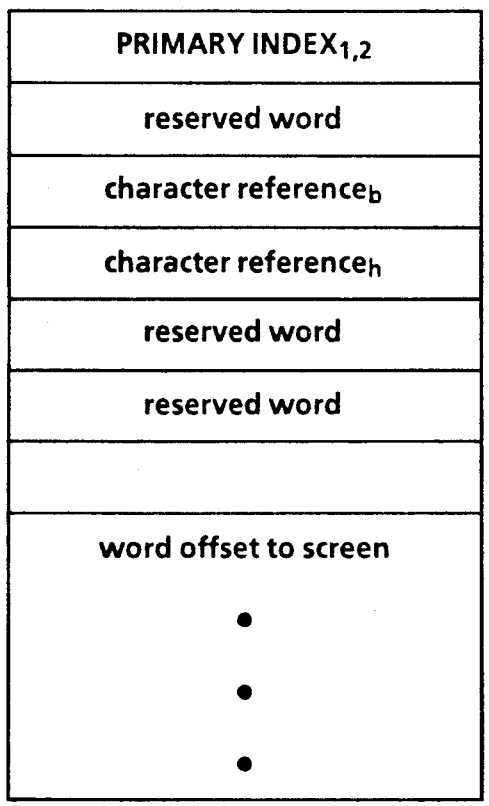
FIG. 13 is a color definition.

FIG. 13 is the color definition. This embodiment can only use black plus one other color. Thus, we have indices for two primaries. The low order byte contains index$_1$ and the high order contains index$_2$. Index$_1$ contains the dominant primary used in this color. Index$_2$ may be zero if there is only one primary used in this color.

There are two character reference words used to locate the black and the highlight bitmaps for this color. Each character reference word holds the font index which is the index into the list of fonts at the beginning of the ink catalog. The character codes for the black bitmaps begin at 16, and the character codes for the highlight bitmaps begin at 136.

The block offset to screen points to the screen that is to be used to implement this color. This is the end of the color definition, other color definitions may follow.

A color definition may begin on a block boundary to allow for fewer disk accesses. A color definition is a fixed length of eight words. It begins with the primary index word. The lower bytes contains index$_1$ and the higher order byte contains index$_2$. Index$_1$ contains the dominant primary used in this color. Index$_2$ may be zero if there is only one primary used in this color. A reserved word was added to hold two more primary indices for a multiple highlight color implementation. Then, there are two words that contain character reference$_b$ and character reference$_h$ that are copied from the screen definition used to implement this color. The character reference words are repeated here for speed of access in line mode. The character reference words are used to locate the black and the highlight bitmaps for this color. Each character reference word holds the font index which is the index into the list of fonts at the beginning of the ink catalog. The character codes for the black bitmaps begin at 16, and the character codes for the highlight bitmaps begin at 136. A zero character reference indicates that there is no font for this color. The two reserved words that follow will be used in the full color ink catalog for additional character references. The next two words contain the block and word offset to the screen that is used to implement this color.

This will be used by the Interpress Decomposer (IPD) to obtain the bitmaps for inks referenced by name.

It is not necessary for color definitions to be stored in any specific order. They can be searched using the color directory.

Figure 14:
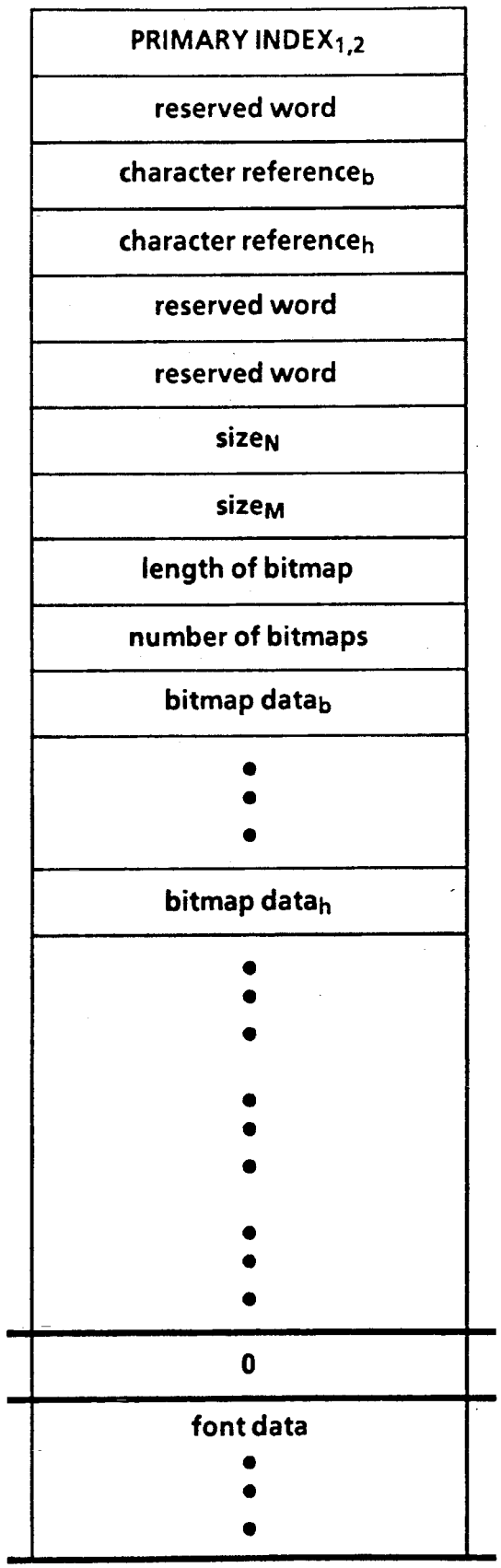
FIG. 14 is a texture definition.

FIG. 14 is the texture Definition. This embodiment can only use black plus one other color. Thus, we have indices for two primaries. The low order byte contains index$_1$ and the high order byte contains index$_2$. Index$_1$ contains the dominant primary used in this texture. Index$_2$ may be zero if there is only one primary used in this texture. There are two character reference words used to locate the black and the highlight bitmaps for this texture. Each character reference word holds the font index which is the index into the list of fonts at the beginning of the ink catalog. The character codes for the black bitmaps begin at 16, and the character codes for the highlight bitmaps begin at 136. The size$_N$ and size$_M$ values are the N columns by M rows of the bitmaps that follow. Although the bitmaps for this texture are defined in a font as specified by the character references, they are also defined here in the Texture definition. The length of the bitmap is given in words and is the same for all the following bitmaps. This is the end of Texture Definition. Other Texture Definitions may follow. This is the end of Palette Structure. Other Palette Structures may follow. The end is padded with zeros until a block boundary. This is the end of the ink catalog.

A texture definition may begin on a block boundary to allow for fewer disk accesses. A texture definition is variable length. It begins with the primary index word. The lower bytes contains index$_1$ and the higher order byte contains index$_2$. Index$_1$ contains the dominant primary used in this texture. Index$_2$ may be zero is there is only one primary used in this texture. A reserved word was added to hold two more primary indices for a multiple highlight color implementation. Then, there are two words that contain character reference$_b$ and character reference$_h$. Character reference words are used to locate the black and the highlight bitmaps for this texture. Each character reference word holds the font index which is the index into the list of fonts at the beginning of the ink catalog. The character codes for the black bitmaps begin at 16, and the character codes for the highlight bitmaps begin at 136. A zero character reference indicates that there is no font for this texture. The two reserved words that follow will be used in the full color ink catalog for additional character references. Next, there are the size$_N$ and size$_M$ values which show the number of columns (bits) and rows (words), respectively, for the bitmaps that will follow. The range of size$_N$ is 1 to $2^{10}$ and the range of size$_M$ is 1 to $2^{10}$. Next, there are two variable length bitmaps. The length of the bitmap specified is for all bitmaps that follow. The number of bitmaps signifies the number of bitmaps that will follow. Bitmap$_b$ is for black and bitmap$_h$ is for highlight color. For future ink catalogs for full color, more bitmaps may follow bitmap$_h$. Although the bitmaps are defined in a font as specified by the character references for use in line/meta mode, they are also defined here for use in Interpress mode.

It is not necessary for texture definitions to be stored in any specific order. They can be searched using the texture directory.

After the last palette structure is where the font file data resides. Each font that resides within the ink catalog begins on a block boundary. Fonts that do not end of a block boundary will be padded with zeroes until the next block boundary.

The following discusses issues related to the creation and use of inks.

A primary is a dry ink toner that is applied through a stencil called a mask in order to image a color. The mask determines the portion of the page to be altered by the primary. Masks are implemented within an ink in two ways: as fill characters and as bit maps.

Colors are inks with no visible structure and are implemented using a mask for each primary (one for black, one for highlight). Textures are inks with visible structure and are also implemented using a mask for each primary (one for black, one for highlight); the only difference between a color and a texture is in the makeup of the mask. Whereas a color is page-aligned and limited to an 8 bit $\times$ 8 bit ink, textures are object-aligned.

The predominant primary of an ink is the primary which contributes the highest percentage to the specified color. This is always the first primary in the list of primaries provided by the Ink Catalog Searching Task.

For inks, the FST entry for character code O'14' should initially contain a negative character alignment value and the HighlightColorStart or HighlightColorEnd CD-code depending on the predominant primary of the ink (HighlightColorStart if the predominantly primary is any highlight color; HighlightColorEnd if the predominant primary is black). The FST entry for character code O'15' should initially contain a negative character alignment value and the HighlightColorEnd CD-code. In addition, the FST entries for character codes O'12' and O'13' should initially contain a negative character alignment value and the HighlightColorStart and HighlightColorEnd CD-codes respectively for use by applications which fill rectangles using color. This scheme allows text (preceded in the DL by character code O'14') to be imaged in the predominant primary of the same ink used to fill rectangles (when the fill characters are preceded in the DL by character codes O'12' or O'13' to select the appropriate primary). These CD-codes will be updated at print-time, thereby enabling colorized resources to be printed on monochrome black-only printers.

The following discusses an implementation for filling boxes with colors or textures using a combination of large fill characters, leading dots characters, trailing dots characters, leading scans characters, left corner characters and right corner characters. Table 2.4 documents the character code groupings for colors and textures. Table 2.5 documents the character code assignments for colors. This section discusses the implementation of fill characters in an ink's font.

Large Fill Character

A 32 bit $\times$ 32 bit character (derived from an 8 bit $\times$ 8 bit ink) with CDF horizontal repeat used to expand its width to 1024 bits. The large fill character is illustrated in FIG. 15. The right columns are replicated 3 times to give a width of 32 bits, and the bottom rows are replicated 3 times to give a height of 32 bits. The FST values are: AL=020000 (CDF=010=horizontal repeat). FMA=@row$_0$. X=width=128 bytes (1024 dots). Y=-height=32 scans. FSS=spacing=1024 dots.

In all cases where a primary does not contribute to a color, the corresponding black or color fill characters are represented in the ink font as Space meta-codes with the appropriate FSS spacing, thereby saving font memory and disk space.

Leading Dots Characters 7 characters [from 1 ... 7 bits wide and 32 bits high, derived from an 8 bit $\times$ 8 bit ink] and representing the rightmost bits of the ink pattern, padded with zeroes to 16 bits such that their bitmaps will be addressable as left corner characters. The 7 bit $\times$ 32 bit leading dots character is illustrated in FIG. 16. The FST values are: AL=0. FMA=@row$_0$. X=width=2 bytes (16 dots). Y=height=32 scans. FSS=spacing=7 dots. The 3 bit $\times$ 32 bit leading dots character is illustrated in FIG. 17. The FST values are: AL=0. FMA=@row$_0$X-=width=2 bytes (16 dots). Y=height=32 scans. FSS=spacing =3 dots.

Left Corner Characters 49 characters [from 1 ... 7 bits wide and from 1 ... 7 bits high, derived from an 8 bit $\times$ 8 bit ink] and representing the lower-rightmost bits of the ink pattern, padded with zeroes to 16 bits such that they may share bitmap space with leading dots characters. The 7 bit $\times$ 7 bit left corner character is illustrated in FIG. 18. The FST values are: AL=0FMA=@row$_1$ of leading dots character (7$\times$32)X=width=2 bytes (16 dots)Y=-height=7 scans. FSS=spacing=7 dots.

Leading Scans Characters 7 characters (32 bits wide and from 1 ... 7 bits high, derived from an 8 bit $\times$ 8 bit ink) with CDF horizontal repeat used to expand their widths to 1024 bits and representing the lowermost bits of the ink pattern. These characters share bitmap space with the large fill character. The 32 bit $\times$ 7 bit leading scans character is illustrated in FIG. 19. The FST values are: AL=020000 (CDF=010=horizontal repeat). FMA=@row$_{25}$ of large fill character. X=width=128 bytes (1024 dots). Y=height=7 scans. FSS=spacing=1024 dots.

Trailing Dots Characters 7 characters [from 1 ... 7 bits wide and 32 bits high, derived from an 8 bit $\times$ 8 bit ink] and representing the leftmost bits of the ink pattern, padded with zeroes to 16 bits such that their bitmaps will be addressable as right corner characters. The 7 bit $\times$ 32 bit trailing dots character is illustrated in FIG. 20. The FST values are: AL=0. FMA=@row$_0$. X=width=2 bytes (16 dots). Y=height=scans. FSS=spacing =7 dots.

Right Corner Characters 49 characters [from 1 ... 7 bits wide and from 1 ... 7 bits high, derived from an 8 bit $\times$ 8 bit ink] and representing the lower-leftmost bits of the ink pattern, padded with zeroes to 16 bits such that they may share bitmap space with trailing dots characters. The 7 bit $\times$ 32 bit right corner character is illustrated in FIG. 21. The FST values are: AL=0. FMA=@row$_1$ of trailing dots character (7$\times$32). X=width=2 bytes (16 dots). Y=height=32 scans. FSS=spacing =7 dots.

Bitmaps are used to implement masks and therefore observe the Interpress conventions for bit- and byte-ordering. For instance, a 32-pixel$\times$32-pixel mask consists of 1024 pixels and can be visualized as illustrated in FIG. 22.

It would be implemented as a one-sample-per-pixel pixel array and would be packed as illustrated in FIG. 23 (note that this illustrates memory as specified by the Interpress standard and does not reflect the DEC/Intel memory addressing scheme).

Figure 24:
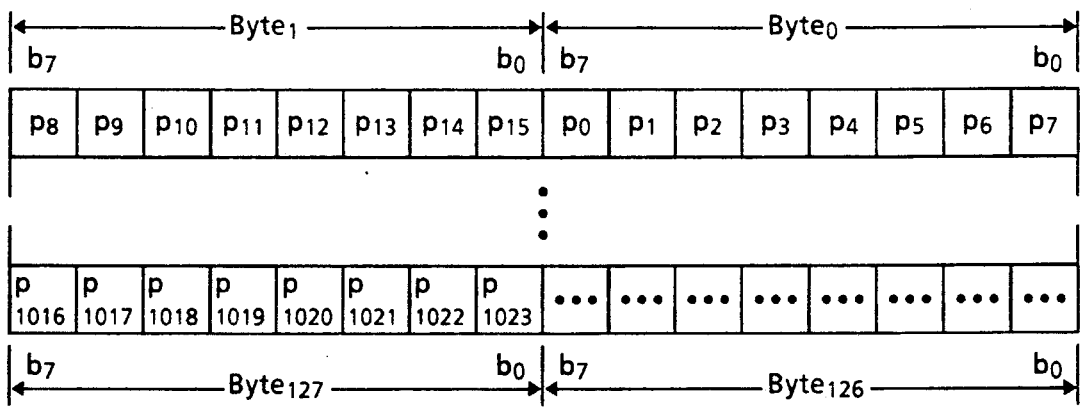
FIG. 24 is a 32×32 mask in DEC memory.

These pixels would be transferred as a byte stream to the printing system's disk and eventually to memory as illustrated in FIG. 24 (note that this illustrates memory according to the DEC/Intel memory addressing scheme):

Ink Compiler

The Ink Compiler is a non-print time, stand alone utility that allows the user to define and create specific inks that can be used on the printer system. With this utility, the user can define palettes, colors, textures, patterns, and screens using commands similar to job source language (JSL). A standard ink catalog is provided in the System Software. The following terms are defined as follows:

Primary

This is a dry ink (toner).

Ink

Imaging operators for the printer are described as applying a primary color to the page through a stencil called a "mask". The mask determines the portion of the page to be altered by the primary color. The ink and possibly the previous content of the altered portion of the page determine the appearance of the portion of the page. An ink can be transparent opaque. Opaque inks alter the page by replacing the previous contents. Transparent inks allow the previous content of the page to show through the non-colored pixels of the ink.

Color

This is an ink without gross structure. Colors are implemented using a halftone screen for each primary, black and color, which specifies the arrangement of the black and color pixels to be printed. This is also known as a "tint".

Screen of Halftone Screen

This is used to implement a color. It specifies the arrangement of the black and color pixels to be printed.

Texture

This is an ink with visible structure. A texture is the result of combining one or more color and pattern pairs. A pattern is a bitmap indicating the portion of the texture which is to have the color associated with that pattern. The pairs are processed in the order in which they are specified and the color is imaged as an opaque ink using the pattern as a mask.

Pattern

This is a mask used to construct a texture. It can also be used to create a screen.

Palette

A collection of screens, patterns, and inks.

Ink Catalog

A collection of palettes.

Figure 25:
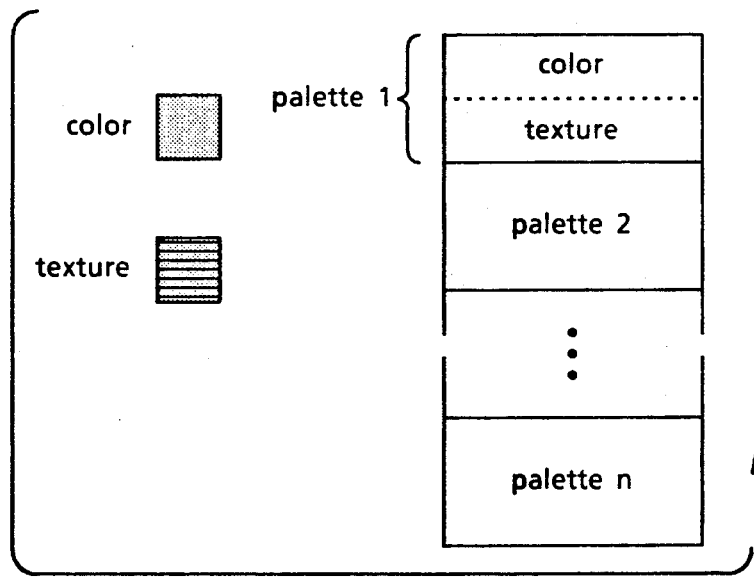
FIG. 25 shows the difference between a color which has uniform appearance and a texture which has visible structure.

FIG. 25 shows the difference between a color which has uniform appearance and a texture which has visible structure. Also, shown are multiple palettes where colors and textures are defined.

Ink Source Language

This section defines the structure an syntax of the Ink Source Language (ISL) which is used to create inks.

Inks are organized into a multi-level hierarchy which is composed of catalogs, palettes, and palette items. The palette items are individual inks. Inks are grouped into collections called palettes. A group of users may employ several palettes for different applications. All the palettes used by the group are stored in an ink catalog. The user of separate catalogs for different groups of users permits each group to define and name inks independently.

Creating Inks

There are two types of inks: colors and textures. Inks typically contain two types of repeating structures. One type called micro-structure is non-visible or barely visible for colors, and the second type called macro-structure is easily visible for textures. The ink is defined by specifying a minimum portion of the structure which can be replicated to make the ink as large as the page. Because all colors are page-registered, a color is aligned with the page such that its origin and the origin of the page coincide. For textures, an optional offset allows the repeating structure of the ink to be aligned with the object being printed.

An ink is defined by indicating the pixels to receive each of the primaries provided by the printing process. A monochrome printer has a single primary, typically black. A highlight color printer has at least two primaries, such as black and red. All colors that can be produced are created by combining one or more primaries on the printing medium. The printer assumes that the printing medium is white and no attempt is made to correct for non-white media.

A color is specified by a device-independent description comprising selection of one of the supplied parametric color models and color parameters to be applied to that model. A color typically has a uniform appearance with no visible structure when viewed from a normal reading distance.

A texture is a composite ink constructed from previously defined inks and patterns which indicate the portion of the texture to receive each ink. In contrast to colors, textures typically have a non-uniform appearance exhibiting some form of gross structure.

Figure 26:
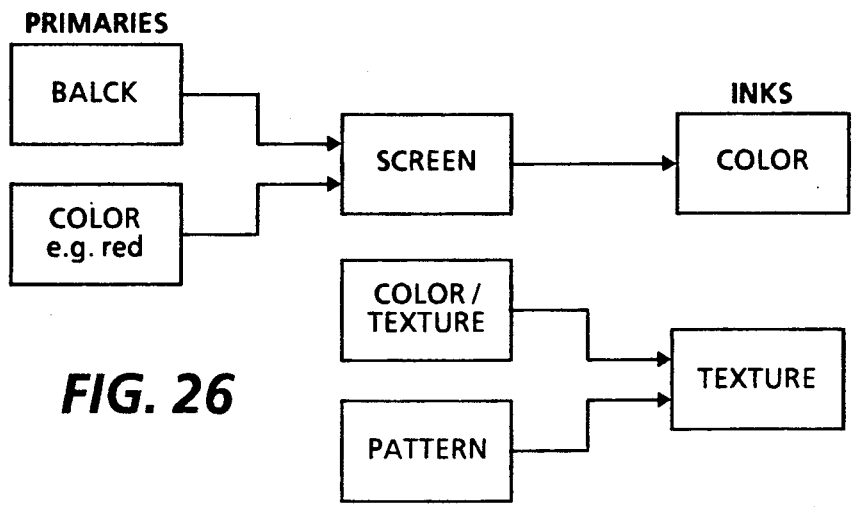
FIG. 26 is a pictorial view of the relationship between screens, colors, patterns and textures.

FIG. 26 is a pictorial view of the relationship between screens, colors, patterns and textures.

The following sections describe the Ink Source Language (ISL) in detail.

Defining Primaries

The Primary statement is provided to associate a primary name with a dry ink (toner) identification number. This is used to identify that particular primary when communicating to or from the IOT.

The format of the Primary statement is as follows:

'primaryname': Primary ID=n, RGB=(rvalue, gvalue, bvalue);

Where n is from 0 to 255, and rvalue, gvalue, bvalue are expressed in decimal, scaled by 10,000, and given as an integer.

Defining Ink Catalogs

An ink catalog contains palettes which contain ink definition that are designed for a specific user community. In many cases, a single catalog will be sufficient for an entire organization. Multiple ink catalogs may be established for specific groups within an organization that have different ink requirements. An ink catalog definition is initiated with the ICATALOG statement. The ink catalog comprises all palettes defined before the next ICATALOG statement, END statement, or physical end-of-file. All entities defined prior to and outside an ink catalog will be made globally available. Palette names must be unique within an ink catalog, but may be reused in different catalogs.

The format of the ICATALOG statement is as follows:

'inkcatalogname': ICATALOG;

Defining Pallettes

Colors and textures are defined in collections called palettes. Multiple palettes may be required to support the needs of different user groups or to support the needs of different applications. The contents of a palette are defined by all the statements following the PALETTE statement. The palette comprises all colors and textures defined before the next ICATALOG statement, PALETTE statement, END statement, or physical end-of-file. Ink names must be unique within a palette, but may be reused in different palettes.

The format of the PALETTE statement is as follows:

'palettename': PALETTE

Defining Colors

Color definition associates a color name with a specification for a desired appearance. This specification includes the color model, color parameter values, primaries, and screenset.

Color models provide a method for specifying color in a manner that is easy to use and extensible. Four models are described below, providing a means of easily specifying colors for printers with capabilities ranging from monochrome to highlight and full color. Currently defined models are MONOCHROME, TINT, and HSM (Highlight Shade and Mixture). The user is advised to select the least capable model which provides the desired capabilities since this will minimize the amount of information that must be supplied.

The interpretation of the color parameters values depends on the color model specified with the MODEL command. These values are used to associate with this color a screen within a screenset specified by the SCNSET command. Colors can access screensets that are global or residing within the current ink catalog and palette. Also dependent upon the color model are the primaries given by the PRIMARY command. Because the interpretation of the values and the primaries are dependent on the color model, the user should specify the model first unless the default model is desired.

The general form of the COLOR statement is as follows:

'colorname': COLOR [colorcommands]
[,VALUE[S]={n|(n[,n] ... )}];

Colorcommands are separated by a comma.

colorcommands:=
MODEL={MONOCHROME|TINT|HSM|RGB|QUANTITY}
{PRIMARY|PRIMARIES}={'primaryname'|('primaryname'[,'primaryname'] ... )}
(The default primary name is the one with ID=0. If however, no primary is given with ID=0, then there will be no default primary. If this command is used with the COPTS statement, then the first primary name given will be used when creating a color with the MONOCHROME or TINT model and the first two will be used with the HSM or QUANTITY model)
SCNSET={'screensetname'|DEFAULT}

The COPTS statement is optional, but is provided to facilitate definition of colors by allowing default values for commands of the COLOR statement to be specified. The default value for a command remains in effect until a new value is specified in a subsequent COPTS statement, the end of a palette, or the end of an ink catalog. Options specified on the COLOR statement override the default values provided by the COPTS statement.

The format of the COPTS statement is as follows:

COPTS colorcommands;

Monochrome Model

In the MONOCHROME model, objects are of a single primary, typically black.

The general form of the color statement in MONOCHROME model is as follows:

'colorname': COLOR MODEL=MON[,colorcommands];

Tint Model

In the TINT model, the objects are described as a single primary or tints of that primary. For example, if the COLOR command specifies PRIMARIES='BLACK', then available colors are black and tints of black (grays).

The VALUE command contains shade, where shade is in the range of 0 (white) to 100 (solid color, typically black).

The general form of the COLOR statement in the TINT model is as follows:

'colorname': COLOR MODEL = TINT,
VALUE = shade [, colorcommands];

Highlight Shade and Mixture Model

In the Highlight Shade and Mixture (HSM) model, the objects are described as a mixture of two primaries, the normal and highlight colors, applied to give the specified shade. The normal and highlight primaries are specified by the PRIMARIES option: PRIMARIES=(normal, highlight).

The VALUE command contains shade and mixture. Shade is the quantity of the combination to apply from none (0) to the maximum amount (100). Mixture is the fraction of the combination which is the highlight color, expressed as a percentage.

The general form of the COLOR command in the HSM model is as follows:

'colorname': COLOR MODEL=HSM,
VALUE=(shade, mixture) [,colorcommands];

Quantity Color Model

IN the Quantity Model, the objects are described as a mixture of two primaries, the normal and highlight colors, applied to give the specified appearance. The normal and highlight primaries are specified by the PRIMARIES option: PRIMARIES=(normal, highlight). This is similar to the HSM model.

The VALUE command contains two quantities which apply to the two primaries, normal and highlight. Both quantities range from none (0) to a maximum amount (100).

The general form of the COLOR command in the QUANTITY model is as follows:

'colorname': COLOR MODEL=QUANTITY,
VALUE=(normal quantity, highlight quantity) [, colorcommands];

Defining Screens

A screenset is a collection of halftone screens with common characteristics. Screens are used to implement colors. They specify the arrangement of the black and color pixels to be printed. The screen set is referenced by the COLOR or COPTS statement. Multiple screen sets are allowed so that the user may select the proper screen characteristics for an application. For example, one screen set may use halftone screens based on a blob growth algorithm. This screen set would be used for applications where a smooth variation in shading is required. Another screen set may use the highest possible screen frequencies. It would provide superior appearance for large tinted areas. Members of a screen set are specified by SCREEN commands following the SCNSET statement. The definition of a screen set must precede any reference to it.

The format of the SCNSET statement is as follows:
'screensetname': SCNSET;

Screens are halftone patterns used to implement colors. Within the SCREEN statement, there are three sets of screen commands: MODEL and VALUES; DTYPE, SIZE, and DATA; PLOC and PNAME. The MODEL AND VALUES commands are identical to those same commands in the COLOR statement. (Because the interpretation of the values and the data or patterns are dependent on the model, the user should specify the model first unless the default model is desired.) The DTYPE, SIZE, and DATA commands allow halftone patterns to be directly specified. The PLOC and PNAME commands allow halftone patterns form an external location to be specified. The interpretation of the DATA and the PNAME commands depends on the color model specified with the MODEL command.

When halftone patterns are directly specified, only the smallest repeating portion of the pattern need be specified. It will be replicated to the size required by the imaging subsystem. Data values are entered in the radix specified by the DTYPE command. Alternately, this value may be specified as a string constant, preceded by the radix indicator X for hex, O for octal, B for binary or D for decimal. It is recommended that all hex values begin with a digit so the compiler will not interpret any hex letters as radix indicators. The radix indicator takes precedence over the DTYPE command. Data values are grouped by parentheses, with either one group of values per primary, or the keyword NONE indicating that the corresponding primary is not used in constructing the color. The data is organized as an array of pixels, n columns by m rows as specified with the SIZE command. This corresponds to portrait orientation with column numbers increasing across the page and row numbers increasing down the page. Data values are placed into the array with the least significant bit corresponding to the highest column number. A 1-bit indicates that ink is to be deposited for the pixel. A 0-bit indicates that no ink is to be deposited for the pixel. If the value provides more than n pixels, the excess pixels are ignored. If less than n pixels are provided, the remaining pixels are filled with zeros. If less than m rows are given, then the Ink Compiler will repeat those rows given to make up the difference. However, if more than m rows are given, then an error message is generated and the screen will not be created.

When halftone patterns form an external location specified by the PLOC command are used, individual patterns are referred to by name in the PNAME command. In the PLOC command if the keyword CURRENT is used, the pattern location is the current ink catalog and the current palette. (NOTE: All global patterns are considered part of the current ink catalog and palette). In the PNAME command, either a pattern name or the keyword NONE must be specified for each primary. The keyword NONE indicates that the corresponding primary is not used to construct the color. Ink catalog and palette names given in the PNAME command will override those given in the PLOC command. When using the PLOC or PNAME commands, an error message will be generated if a specified ink catalog or palette location does not exist. Also, an error message will be generated if the pattern does not exist.

When a halftone pattern is specified whether directly or from an external location using the TINT model wit a value of zero, it will be taken as the definition of a highlight TINT screen.

The format of the SCREEN statement is as follows:

```
SCREEN screencommands;
  Screencommands are separated by a comma.
    screencommands : =
      [ MODEL = { MONOCHROME | TINT | HSM | QUANTITY}, ]
        VALUE[S] = { n | (n [, n] ... ) }
      [ DTYPE = { BINARY | OCTAL | HEX | DECIMAL }, ]
        [SIZE = ( n, m), ] where {n|m} = {2 | 4| 8}
        DATA = {n | ( datagroup [, datagroup] ... ) }
        datagroup : = { ( n [, n] ... ) } | NONE }
      [PLOC = {'[inkcatalogname.]palettename'| CURRENT},]
        PNAME = {patterngroup|(patterngroup
          [,patterngroup] ... ) }
        patterngroup: = {'[[inkcatalogname.]palettename.]
          patternname'| NONE}
```

The SOPTS statement is provided to facilitate definition of screens. It allows default values for commands of the SCREEN command to be specified. The default value for a command remains in effect until a new value is specified for the command in a subsequent SOPTS statement, end of a palette, or end of an ink catalog. Commands specified on the SCREEN statement override the default values provided by the SOPTS statement.

The format of the SOPTS statement is as follows:
SOPTS soptscommands;

Soptscommands need to be separated with a comma.
soptscommands:=
MODEL={MONOCHROME|TINT|HSM|QUANTITY}
SIZE=(n, m) where {n|m}=2|4|8
DTYPE={BINARY|OCTAL|HEX|DECIMAL}
PLOC={'[inkcatalogname.]palettename'|CURRENT}

Defining Textures

A texture is a composite ink. A texture is constructed by "imaging" a series of patterns each with a specific ink. The patterns are treated as masks and are "imaged" with the corresponding ink in the order specified.

A texture is constructed by the following process. It is initialized to all zero pixels. For each pattern-ink pair, the result is calculated as follows:

texture = (texture AND (NOT (pattern))) OR (pattern AND ink)

The format of the TEXTURE statement is as follows:
'texturename': TEXTURE texturecommands;

Texturecommands need to be separated with a comma.

```
texturecommands:
    PATTERN[S] =
        {'[inkcatalogename.palettename.]patternname' |
        ('[inkcatalogename.palettename.]patternname'
        [,'[inkcatalogename.palettename.]patternname'] ... )}
    INK[S] = {'inkname'('inkname'[,'inkname'] ... )}where
    inkname : = {'[inkcatalogename . palettename .] colorname' |
    '[inkcatalogename.palettename.]texturename'}
```

There must be an identical number of INKs and PATTERNs. For example, if two (2) patterns are given then two (2) corresponding inks must also be given, the 1st ink for the 1st pattern, the 2nd ink for the 2nd pattern.

}

Defining Pattern Ink Source Language Command Summary

'primaryname': PRIMARY ID=n, RGB=(rvalue, gvalue, bvalue);

The PRIMARY statement is provided to associate a primary name with an identification number and the RGB color coordinates. The identification number, n, is used to identify that primary in communication to or form the IOT. Rvalue, gvalue, and bvalue are scaled by 10,000 and given as an integer.

'inkcatalogname': ICATALOG; An ink catalog definition is initiated with the ICATALOG statement.

'palettename': PALETTE; A palette definition is initiated with the PALETTE statement.

COPTS colorcommands; The COPTS statement is optional. It is provided to allow default values for commands of the COLOR statement to be specified.

'colorname': COLOR [colorcommands] [VALUES[S]=n|(n[,n] ... )];

The COLOR statement associates a colorname with a specification for a desired appearance.

colorcommands are as follows:

MODEL={MONOCHROME|TINT|HSM|QUANTITY}

Models are provided as a means of easily specifying colors for printers with capabilities ranging from monochrome to highlight and in the future full color.

PRIMARY|PRIMARIES={'primaryname'|('-primaryname'[,'primaryname'] ... )|}

The PRIMARIES option is used to specify the primary colors used in the specified color model. The default primary name is the one with ID=0.

SCNSET={'screensetname'|DEFAULT}

The SCNSET option references a collection of halftone screens with similar characteristics.

'screensetname': SCNSET;

A screen set is a collection of halftone screens with common characteristics. Members of a screen set are specified by SCREEN statement following the SCNSET statement.

SCREEN screencommands; The SCREEN statement allows the user to define halftone patterns used to implement colors.

screencommands are as follows:

[MODEL ={ MONOCHROME | TINT | HSM | QUANTITY},]
VALUE[S] = n | ( n [, n] ...)

Four models are provided as a means of easily specifying colors for printers with capabilities ranging from monochrome to highlight and fill color.

[DTYPE = { BINARY | OCTAL | HEX | DECIMAL },] [SIZE = (n, m),]
DATA = {datagroup | (datagroup[, datagroup] ... ) }
    datagroup = { (n [, n] ... ) | NONE }

The DTYPE option specifies the radix that the data values are entered in. The number of datavalues is indicated by the SIZE command (n×m) where $\{n|m\} = \{2|4|8\}$.

[PLOC = {'[inkcatalogname.]palettename'|CURRENT},]
PNAME = { patterngroup | ( patterngroup [, patterngroup] ... )

patterngroup                                                group
{'[[inkcatalogname.]palattename.]patternname'|NONE}

The PLOC option is used to specify the pattern location and the PNAME option references a particular pattern.

SOPTS soptscommands; The SOPTS statement is provided to allow default values for commands of the SCREEN statement to be specified.

soptscommands are as follows:

MODEL={MONOCHROME|TINT|HSM|QUANTITY}

This is the same as above.

SIZE=(n,m) where $\{n/m\} = \{2|4|8\}$

This is the same as above.

DTYPE={BINARY|OCTAL|HEX|DECIMAL}

This is the same as above.

PLOC={'[inkcatalogname.]palettename'|CURRENT}

This is the same as above.

'texturename': TEXTURE texturecommands;

A texture definition is initiated with the TEXTURE statement.

texturecommands are as follows:

PATTERN[S]={'[inkcatalogname.palettename.]patternname'|

('[inkcatalogename.palettename.]patternname'
[,'[inkcatalogename.palettename.]patternname'] ... )}

The PATTERN command is used to construct a texture. They are treated as masks and are "imaged" with a corresponding ink in the order specified.

INK[S] = {'inkname' ('inkname'[, 'inkname'] ... )} where
  inkname : = {'[inkcatalogename . palettename .] colorname' |
  '[inkcatalogename . palettename .] texturename'}

The INK command is used along with the PATTERN command to construct a texture. The number of inks must match the number of patterns given.

'patternname': PATTERN patterncommands;

A pattern definition is initiated with the PATTERN command.

patterncommands are as follows:

[DTYPE = { BINARY | OCTAL | HEX | <u>DECIMAL</u>}, ] [SIZE = (n, m),]
DATA = {n| ( n [, n] ... )}

This is the same as above.

[PLOC = {'[inkcatalogname.]palettename'|<u>CURRENT</u>},]
PNAME =
{'[[inkcatalogname.]palettename.]patternname|('[[inkcatalogname.]palettename.]
patternname'[,'[[inkcatalogname.]palettename.]patternname' ... )}

This is the same as above.

POPTS poptscommands: The POPTS statement is provided to allow default values for commands of the PATTERN statement to be specified.

poptscommands are as follows:

SIZE=(n,m) where {n|m}={2|4|<u>8</u>}

This is the same as above.

DTYPE={BINARY|OCTAL|HEX|<u>DECIMAL</u>}

This is the same as above.

PLOC={'inkcatalogname.palettename'|<u>CURRENT</u>}

This is the same as above.

Ordering of ISL Statements

Inks are organized into a multi-level hierarchy which is composed of ink catalogs, palettes, and palette items. When using ISL statements to define ink catalogs, palettes, or palette items, the ordering and grouping of statements are important since any item must be defined first before it can be referenced. Also, the Ink Compiler expects certain ordering of commands to allow the successful creation of ink catalogs. Ordering and grouping rules along with general rules are defined below.

Ordering and Grouping Guidelines

The first commands specified should be the PRIMARY commands. This command allows the customer to associate the desired name with a dry ink (toner) identification number. The Ink Compiler needs to know this information up front.

2. A PALETTE command cannot precede the first ICATALOG command in an ISL file. This is because a palette must be defined within a specific ink catalog.

3. Any command which precedes an ink catalog command is considered global. Also, any command which is after an ink catalog command, but prior to the first palette command is considered global to all the palettes within that ink catalog. The ink compiler will only allow commands to create screens and patterns to be global.

4. Stray commands which are those commands that do not reside within a palette boundary or within the global area are not allowed.

General Rules

1. Ink Catalog names must conform to the current printing system convention for file names with all characters being alphanumeric and enclosed in single quotes.

2. Primary names must be enclosed in single quotes and have a limit of 32 alphanumeric characters.

3. Palette, screenset, pattern, color, and texture names must be enclosed in single quotes and have a limit of 32 alphanumeric characters plus the space character with at least one character being alphanumeric.

4. Keywords cannot be used as names.

5. Palette names must be unique within an ink catalog, but may be reused in different catalogs.

6. Screenset, pattern, color, and texture names must be unique within a palette, but may be reused in different palettes.

7. Primary ID numbers must be unique.

8. Comments are allowed and must be enclosed with /* and */.

Any item must be defined before it can be referenced in another statement. One possible ordering of statements which will avoid this problem is shown below:

'RED': PRIMARY ID = 29, YES = (23,32,17)/* all primaries are defined first*/
'BLACK': PRIMARY ID = 0, YES = (0,0,0);
'MY SCREENS': SCNSET;       /* screen definitions */
SOPTS MODEL = HSM, SIZE = (8,8), DTYPE = OCTAL;
SCREEN                       VALUES = (100,100),
DATA = ((NONE),(377,377,377,377,377,377,377,377));
POPTS    SIZE = (8,8),DTYPE = OCTAL;    /* pattern
                                            definitions
                                            */
'MY PATTERN': PATTERN DATA = (0,377,0,377,0,377,0,377);
'MY CATALOG': ICATALOG; /* ink catalog 1 */
'MY PALETTE': PALETTE; /* palette 1 in catalog 1 */
COPTS SCNSET = 'MY SCREENS', MODEL = HSM;
/* colors in palette 1, catalog 1 */
'MY RED': COLOR PRIMARIES = (BLACK,RED),
VALUES = (100,100);
'MY TEXTURE': TEXTURE PATTERN = 'MY PATTERN',
INK = 'MY RED';textures in palette 1, catalog 1 */
'YOUR PALETTE': PALETTE;/* palette 2 in catalog 1 */
  .'YOUR CATALOG': ICATALOG; /* ink catalog
    2 * Compilation Command An .ISL (Ink Source Language) file is created using EDIT and contains the commands defined in section 3.2.9.1 Ink Source Language. The Ink Compiler will compile this file with the following command: I C O filename options where filename is explained below:

filename specifies the 1 to 6 alphanumeric character name of an Ink Source Language ISL) file which is the input to the Ink Compiler. This filename may optionally include the file extension. (.ISL.).

where options may be any combination of the following and each are separated by a space:

NOP[RINT] specifies that all source records and syntax or fatal errors are to be printed during compilation. If there are no syntax or fatal errors, there will be no print out. The default is to print all messages plus the source records.

REP[LACE] specifies that the Ink Compiler may replace an existing ink catalog (.ICT) file with a new output file of the same name. This is the default.

NOR[EPLACE] specifies that the Ink Compiler is not to create an ink catalog (.ICT) file if it has the same name as an existing file. REPLACE is the default. (NOTE: If both REPLACE and NOREPLACE are specified in the compilation command, then whichever was given last will be honored).

TRA[Y] specifies that the listing and error messages from the Ink Compiler are to go to the sample tray. If TRAY is not specified, the printout will go to the output stacker.

DIS[PLAY] specifies that all syntax error messages are to be displayed on the keyboard/display. The default is to print the syntax error messages only on the listing.

Operator Message Summary

The following new messages, which are shown here with a brief explanation, may be displayed to the operator by the Ink Compiler. Most of these messages are identical or similar to the PDL messages which are shown in the 4050 Reference Manual. All messages that exceed 80 characters will be truncated to 80 characters.

Confirmation Messages

IC0100 NOREPLACE SPECIFIED.
 (The Ink Catalog file will now be replaced.)
IC0150 REPLACE SPECIFIED.
 (The Ink Catalog file will be replaced.)
IC0200 ICT REPLACED.
 (The Ink Catalog file will be replaced.)
IC0510 SOURCE FILE IS FULL.
 (The file containing the source records plus existing error records is full.)
IC0900, ABORT REQUESTED BY
 (Compilation has been aborted by the operator. Abort only occurs when it is safe for the Ink Compiler to stop processing.)
IC1010, STARTING COMPILATION . . .
 (Compilation has begun.)
IC1000, COMPILATION COMPLETED.
 (Compilation has completed.)
IC0600, CREATED INK CATALOG <icatalogname>.
 (The Ink Compiler has successfully created an ink catalog.)
IC0500, INK CATALOG <icatalogname> WILL NOT BE CREATED.
 (Due to errors, an ink catalog will not be created.)
IC1050, THE INK COMPILER WILL EXIT TO PRINT.
 (The Ink Compiler has finished compiling and will exit to print source records plus any existing error records.)
IC1100, ******* ISL CONTAINED ERRORS *******
 (The Ink Compiler detected errors during the compilation process.)

Routine Maintenance or Action Messages

IC700, OPERATOR COMMAND ERROR, RETRY.
 (The command to initiate the compilation process was invalid.)
IC2740 ISL NOT FOUND, CHECK AND RETRY.
 (The ISL file was not found on the system's disk.)

System Problem Messages

Probable Severe Software Error Messages

IC8200 INTERNAL ERROR WITHIN THE INK COMPILER.
 (Unexpected error occurred within the Ink Compiler.)
IC8210 PROBLEMS ALLOCATING SPACE.
 (Could not allocate a specified amount of space.)
IC1200 THE INK COMPILER CANNOT PROCEED DUE TO ERRORS.
 (The Ink Compiler must exit due to fatal errors, like unexpected error conditions.)
IC1210 ERROR(S) OCCURRED WHILE CREATING INK CATALOG icatalogname>.
 (Errors occurred during the creation of an ink catalog.)

Probable Severe Hardware Error Messages

IC9500 PROBLEMS OPENING FILE <filename>.
 (Could not open a file.)
IC9510 PROBLEMS READING FROM FILE <filename>.
 (Could not read from a file.)
IC9520 PROBLEMS WRITING TO FILE <filename>.
 (Could not write to a file.)
IC9530 PROBLEMS CLOSING FILE <filename>.
 (Could not close a file.)

Printed Error Message Summary

The Ink Compiler is a two pass compiler and syntax analysis occurs during the first pass. If a syntax error is found, then an error message will be immediately generated for the line in which the error occurred and analysis will resume on the next Ink Source Language statement.

The Ink Compiler tries its best to recover from errors found during the second pass. These error messages are generated for the entire ISL statement with this being after the terminating semicolon is processed.

SYNTAX ERROR ON LINE <line number>.
 (A syntax error was detected.)
SYNTAX ERROR: The number of patterns and inks are not equal.
 (In a TEXTURE statement, the number of patterns is not the same as the number of inks.)
SYNTAX ERROR: Expecting <value> and not <value>.
 (During syntax analysis, the Ink Compiler was expecting a certain value and it was not found.)
SYNTAX ERROR: Keywords cannot be used as names.
 (Keywords cannot be used as names.)
SYNTAX ERROR: Cannot use name <name> as specified.
 (Invalid name given.)
SYNTAX ERROR: Invalid keyword <keyword>.
 (Invalid keyword was detected.)
SYNTAX ERROR: Invalid command.
 (Invalid command was detected.)
LINE <line number>: Pattern location does not exist.
 (The external pattern location which is either an ink catalog or palette, specified with the PLOC/PNAME commands is not defined.)
LINE <line number>: Pattern does not exist.

(The pattern specified with the PNAME command is not defined.)

LINE <line number>: Names should be unique.
(Ink names must be unique within a palette, but may be reused in different catalogs.)

LINE <line number>: <name> has not been previously defined.
(The ordering of ISL statements is important. All items must be defined before they can be referenced.)

LINE <line number>: Data values do not match size specified.
(This message is given when the Ink Compiler cannot create a bitmap with the data values given.)

LINE <line number>: Command is inconsistent with model.
(In the COLOR statement, the number of values and primaries depend on the color model specified. In the SCREEN statement, the number of values, datagroups, and patterngroups depend on the color model specified.)

LINE <line number>: Ink catalog must contain at least one palette.
(An ink catalog must contain at least one palette.)

LINE <line number>: Encountered a premature END or EOF
(END command or EOF (end of file) encountered unexpectedly.)

LINE <line number>: Value <value> is incompatible with radix.
(Data value given could not be used with the DTYPE specified;)

LINE <line number>: Bad value <value> given.
(In the VALUE command, shade or mixture was not in the range of 0 to 100; or in PRIMARY command, the ID was not in the range of 0 to 255.)

LINE <line number>: All primary names must be defined first.
(Primary commands must be defined at the beginning of an ISL file.)

LINE <line number>: ICATALOG command must precede PALETTE command.
(A palette command must reside in an ink catalog boundary.)

LINE <line number>: END command is not balanced.
(Too many END commands were encountered.)

LINE <line number>: Primary ID numbers must be unique.
(The Ink Compiler will not accept similar primary ID's.)

LINE <line number>: <name> cannot be created.
(Due to errors, a screen, color, texture, or pattern could not be created.)

LINE <line number>: Ink does not exist.
(There is no such ink defined.)

LINE <line number>: Size command is invalid.
(The size command takes two values: n and m. n or m can only be 2, 4, or 8.)

LINE <line number>: Command exceeds Ink Compiler's capability.
(The TEXTURE command and the RGB color model exceed the Ink Compiler's capability. Also, any command other than SCNSET, SCREEN or PATTERN in the global area exceeds the Ink Compiler's capability. Stray commands (those commands which do not reside within a palette boundary or within the global area) exceed the Ink Compiler's capability.)

LINE <line number>: Maximum limit has been exceeded.
(The maximum number of palettes (999), ink fonts (65534), or primaries (256) has been exceeded.)

LINE <line number>: WARNING! Screen approximation occurred.
(The specified screen does not exist in the screenset, so the closest screen was used instead.

The following is the system default ink catalog. The first four entries are examples of primaries (toners).
'BLACK': PRIMARY ID=0, YES=(0,0,0);
'GREEN': PRIMARY ID=27, YES=(1226,-852,6);
'BLUE': PRIMARY ID=28, YES=(0,0,0);
'RED': PRIMARY ID=29, YES=(2285,3203,1657);

The ID number identifies the commercial number of the ink, and the YES value is the industry standard definition of the color.

The following is a portion of a typical catalog of colors.
'BACKGROUNDS':SCNSET;/*2X4 CELL WITH OFFSET,45 SCREENS */
SOPTS      MODEL=HSM,SIZE=(4,4),DTYPE=-HEX;
SCREEN     VALUES=(0,0),DATA=(NONE,NONE);
SCREEN     VALUES=(10,0),DATA=((8,0,2,0),-NONE);
SCREEN     VALUES=(20,0),DATA=((0C,0,3,0),-NONE);
SCREEN     VALUES=(38,0),DATA=((0C,4,3,1),-NONE);
SCREEN     VALUES=(52,0),DATA=((0C,0C,3,3),-NONE);
SCREEN     VALUES=(65,0),DATA=((0C,0E,3,0B),-NONE);
SCREEN     VALUES=(80,0),DATA=((0C,0F,3,0F),-NONE);
SCREEN     VALUES=(95,0),DATA=((0D,0F,7,0F),-NONE);
SCREEN     VALUES=(100,0),DATA=((FF,FF,FF,FF),NONE);
SCREEN     VALUES=(20,50),DATA=((8,0,2,0),(2,0,8,0));/*10,10*/
SCREEN     VALUES=(30,66),DATA=((8,0,2,0),(3,0,0C,0));/*10,20*/
SCREEN     VALUES=(48,79),DATA=((8,0,2,0),(3,1,0C,4));/*10,38*/
SCREEN     VALUES=(62,84),DATA=((8,0,2,0),(3,3,0C,0C));/*10,52*/
SCREEN     VALUES=(75,87),DATA=((8,0,2,0),(3,0B,0C,0E));/*10,65*/
SCREEN     VALUES=(90,89),DATA=((8,0,2,0),(3,0F,0C,0F));/*10,80*/
SCREEN     VALUES=(100,94),DATA=((8,0,2,0),(7,0F,0D,0F));/*6,94*/

The screen value is the amount of each color ½the time. Thus, SCREEN VALUES=(20,50) means that the first primary is applied at a 20% level for the first half of the screen (=10%) and the second primary is applied at a 50% level for the second half of the screen (25%). The DATA represents the bit map in hex. Thus for a 4 by 4 bit matrix, if DATA=8,0,2,0, then the first line of the bit map is 1000, the second is 0000, the third is 0010, and the fourth is 0000.

Figure 27:
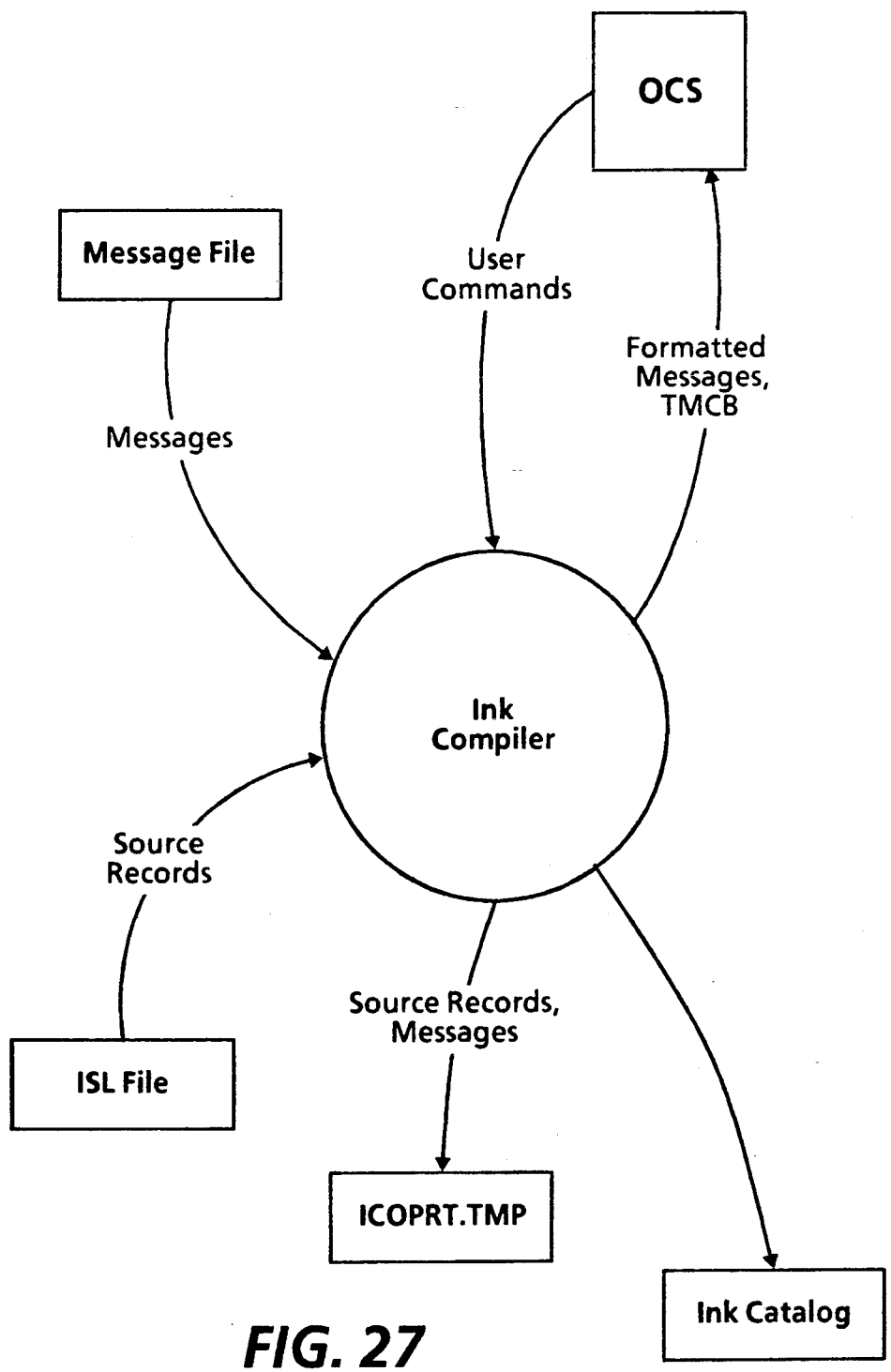
FIG. 27 is a simple block diagram of the printing system.

In the program the primary colors are identified as follows:

'RED': COLOR PRIMARY='RED';
'BLUE': COLOR PRIMARY='BLUE';
'GREEN': COLOR PRIMARY='GREEN';
'BLACK': COLOR PRIMARY='BLACK';

The following are examples of colors that can be created from red and black primaries:
'WHITE': COLOR VALUES=(0,0);
'LIGHT GRAY 3': COLOR VALUES=(28,0);
'DARK GRAY 2': COLOR VALUES=(59,0);
'BLACK': COLOR VALUES=(100,0);
'LIGHT PINK 1': COLOR VALUES=(25,100);
'MODERATE PINK 3': COLOR VALUES=(44,100);
'DARK PINK 3': COLOR VALUES=(53,100);
'MODERATE RED 2': COLOR VALUES=(59,100);
'DEEP RED 5': COLOR VALUES=(78,100);
'RED': COLOR VALUES=(100,100);
'PINKISH GRAY 2': COLOR VALUES=(20,40);
'GRAYISH RED 8': COLOR VALUES=(56,45);
'DARK RED 7': COLOR VALUES=(75,41);
'REDDISH GRAY 3': COLOR VALUES=(46,17);
'BLACKISH RED 4': COLOR VALUES=(83,10);

The compiler will produce these files by the process shown as data flow diagrams on FIGS. 27 through 31. FIG. 27 is a simplified diagram of the entire compiler. The OCS is the operating system that the operator works with. User commands entered at the terminal are sent to the compiler and the compiler generates formatted messages to be displayed at the terminal. The compiler words as an interpreter in that commands in the form of instructions and data are operated on by the compiler one at a time as they are entered. Any errors encountered in the input commands result in an error message which is sent from the Message file to the operator. The ISL file stores and transmits source records to the compiler which are used in conjunction with the commands to build an ink catalog. The ICOPRT.TMP file keeps a record of the process by storing source records and error messages.

Figure 28:
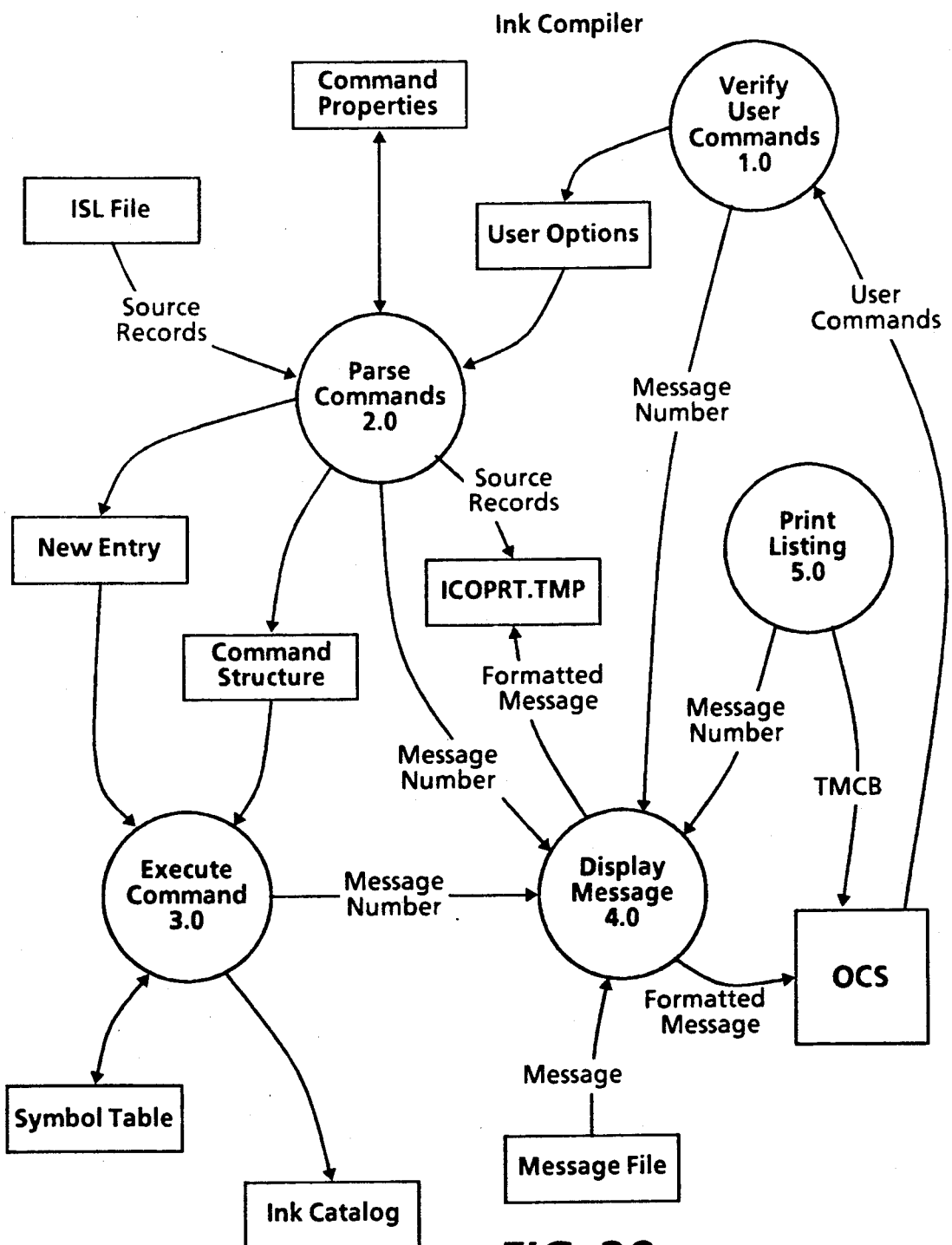
FIGS. 28 through 31 are Data Flow Diagrams.

FIG. 28 shows the process in more detail. The OCS is the operating system at which the operator types in user commands. At 1.0 these commands are verified and if any errors are encountered, the process is aborted and a code number corresponding to the associated error message is sent to the Display Message section 4.0 where the code number is translated into a text message and sent to the operating system for display. This message can also be sent to the Print Listing if the user needs a printed version. Commands are sent to the User Option file, and the source record and error messages are stored in the ICOPRT.TMP file.

The User options are taken in by the Parse Commands section 2.0 and are parsed into tokens. Then each token is acted upon in order. If the command is to access a previously entered file, it is taken from the ISL file, and if it is to access a previously entered command it is taken from the Command Properties file. Commands are entered into the Command Structure and data is entered into the New Entry file. The new data is then acted upon in accordance with the new command by the Execute Command section 3.0 which results in a new Symbol Table and a new Ink Catalog.

Figure 29:
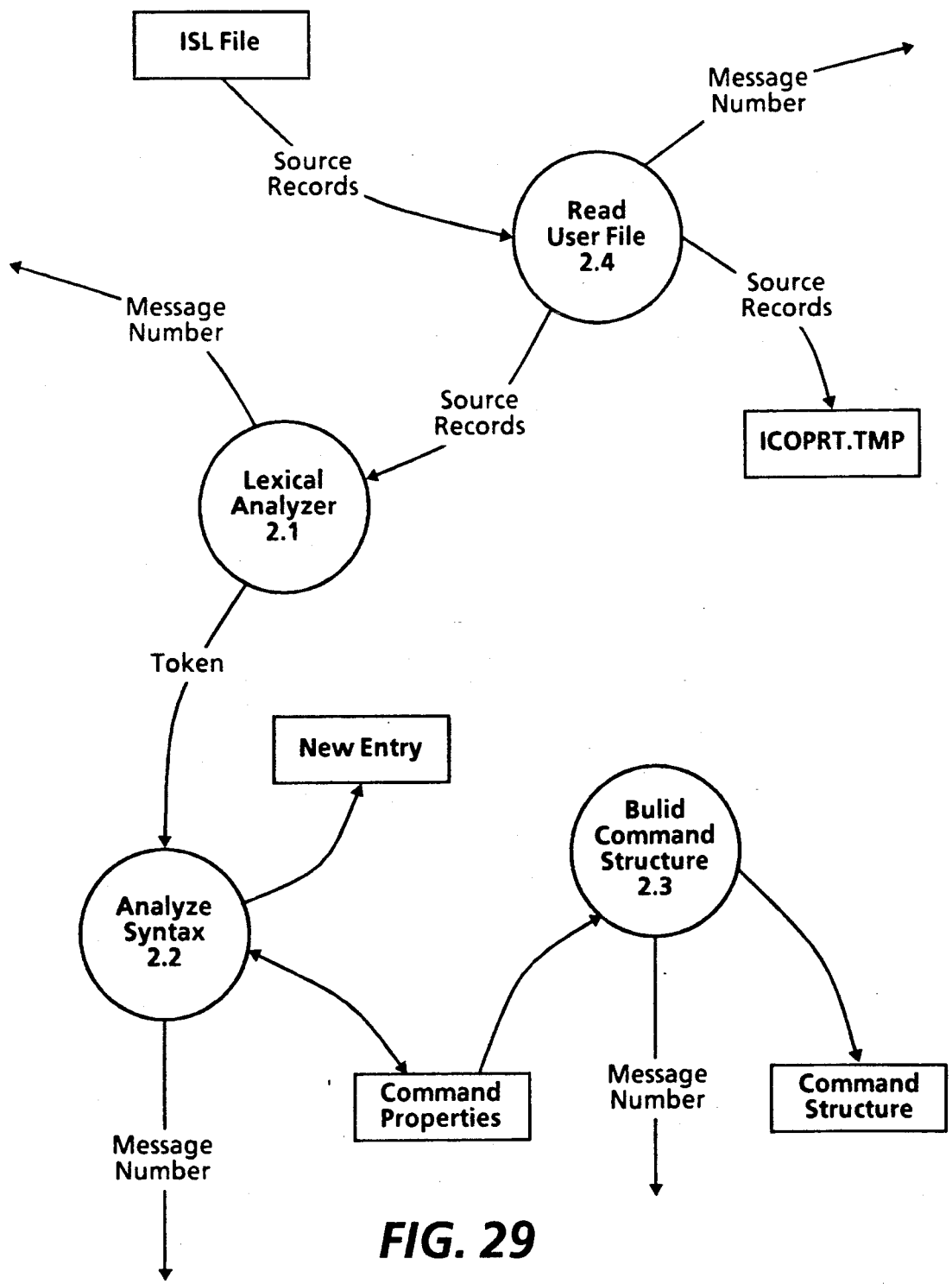
Figure 29A:
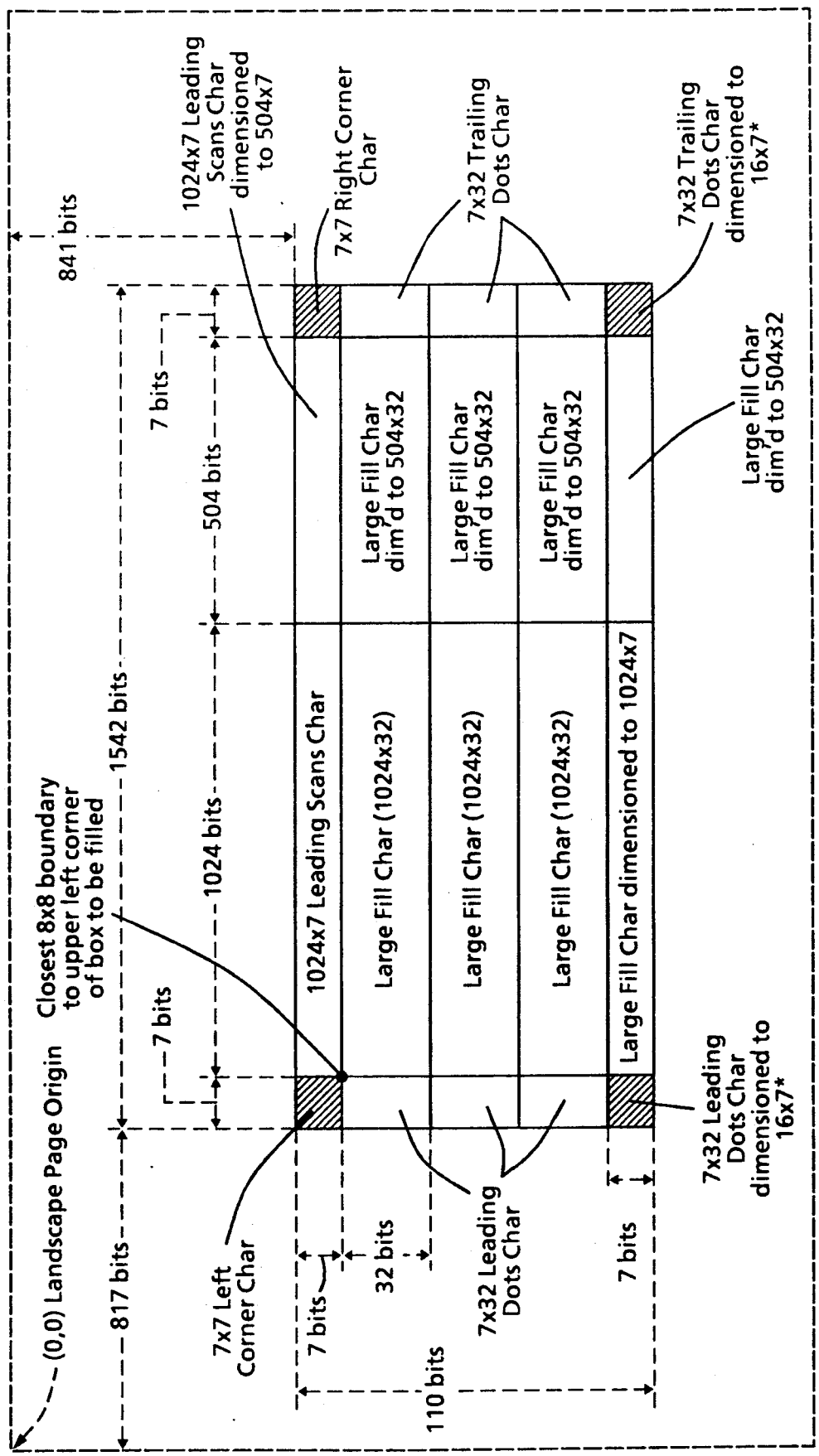
FIG. 29A illustrates the method of filling a box.

FIG. 29 shows the Parse Command section 2.0 of FIG. 28 in more detail. The contents of the ISL file is read into the Read User File section 2.4 a block at a time, and is parsed into tokens which are sent, one at a time, to the Lexical Analyzer 2.1 and the Analyze Syntax section 2.2 for error checking. If this is the first pass, the process ends here. If this is the second pass, the program continues by storing new data in the New Entry file and new commands in the Command Properties file. The Build Command Structure section 2.3 then uses the Command Properties to build a Command Structure.

Figures 30, 30A:
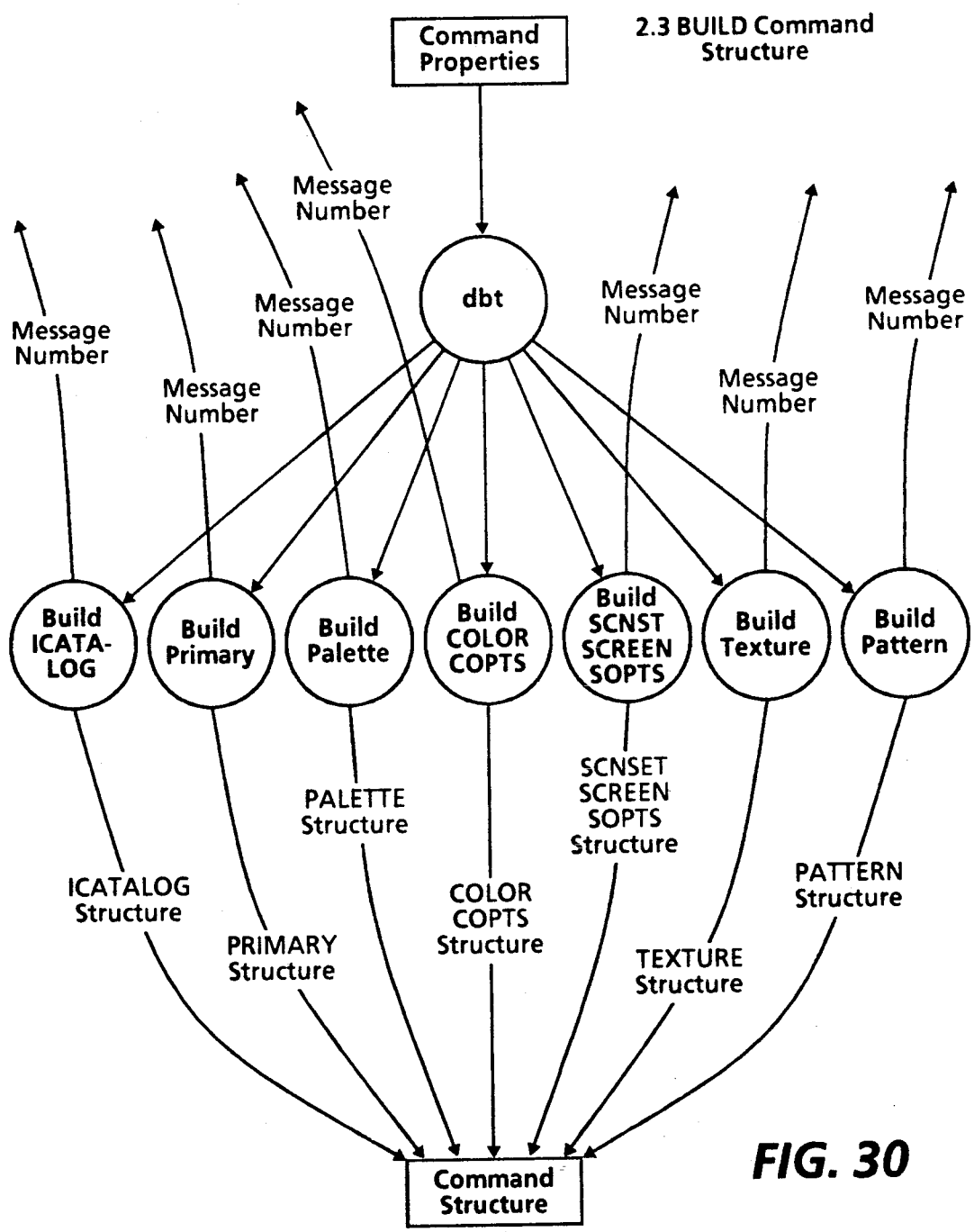
FIG. 30A shows the ink character code groupings.

The Build Command Structure 2.3 section of FIG. 29 is shown in more detail in FIG. 30. The Command Properties are distributed by type as shown, resulting in separate files for the building of catalogs, lists of primaries, palettes, etc, all of which are stored in the Command Structure file.

Figure 31:
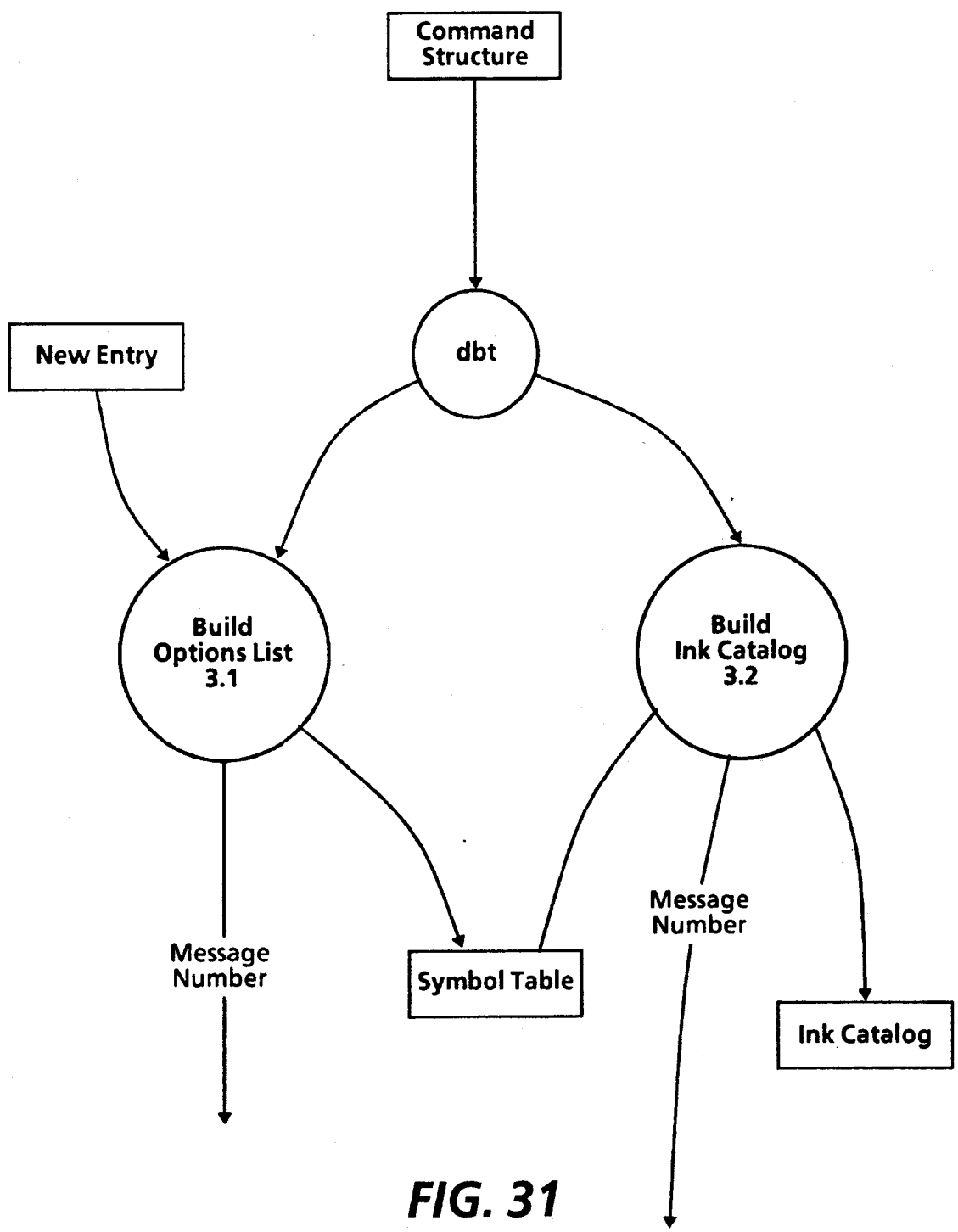

FIG. 31 shows that either the New Entries are acted on by the commands in the Command Structure in the Build Options List section 3.1 to generate a Symbol Table, or that the Symbol Table entries are acted upon in the Build Ink Catalog section 3.2 by the Commands to create an Ink Catalog.

Each element in the discussion of the data flow diagrams 27 through 31 is described in more detail as follows.

Commands.D

These are the JSL-like statements which are entered into a file using EDIT.

The Ink Compiler parses these statements and then executes them accordingly. Prior to being parsed, these statements are written to a file called ICOPRT.TMP which is used to print the statements plus any existing error messages after the compilation process.
Date Created: Aug. 14, 1989
Last Modified: Sep. 28, 1989
Status: {No walkthrough|Informal|Formal|Accepted Into Library}
Composition:
Aliases:
Comments:

Command Properties.DS

This is a structure composed of the command type along with valuable information regarding the command type that needs to be passed to the routing Build Command Structure.
Date Created: Nov. 14, 1989
Last Modified: Nov. 14, 1989
Status: {No walkthrough|Informal|Formal|Accepted into Library}
Composition:

```
struct CMDPRP {
    char type;
    char noopts;
    unsigned short r50nam[2];
    unsigned short Inktyp;
    unsigned short size;
    void *list_p;
};
```

Aliases: cmdprp, Command Prop.
Comments:

Command Structure.D

This is a structure composed of the command type along with valuable information regarding the command type that needs to be passed to the routing Execute Command.
Date Created: Aug. 14, 1989
Last Modified: Aug. 14, 1989

Status: {No walkthrough|Informal|Formal|Accepted into Library}
Composition:

```
struct CMDSTR {
    char type;
    char noopts;
    unsigned short r50nam[2];
    unsigned short idlen;
    void *ptr_p;
};
```

Aliases:
Comments: [ICATALOG structure|PRIMARY structure|PALETTE structure|COLOR structure|COPTS structure|SCNSET structure|SCREEN structure|SOPTS structure|TEXTURE structure|PATTERN structure|END structure]

Formatted Message.D

A message from the message file that may be formatted with appropriate data to make the message more meaningful.
Date Created: Jan 10, 1990
Last Modified: Jan. 10, 1990
Status: {No walkthrough|Informal|Formal|Accepted into Library}
Composition:
Aliases:
Comments: EX. A message from the message file may look like:
ICXXXX Invalid keyword '%S'.
but the formatted message may look like:
ICXXXX Invalid keyword 'TEXTRUE'.

ICOPRT.TMP.DS

This is a file containing the source records from the ISL File plus any messages. This file will be used to print the listing of the ISL file after compilation.
Date Created: Nov. 14, 1989
Last Modified: Nov. 14, 1989
Status: {No walkthrough|Informal|Formal|Accepted into Library}
Composition:
Aliases:
Comments:

Ink Catalog.DS

This is the end product of the Ink Compiler which is a file that contains all the information about the user defined palettes, colors, screens, patterns, and textures.
Date Created: Aug. 14, 1989
Last Modified: Aug. 14, 1989
Status: {No walkthrough|Informal|Formal|Accepted into Library}
Composition:
Aliases:
Comments:

ISL File.DS

This is the actual file which contains the ISL (JSL-like)- statements.
Date Created: Aug. 14, 1989
Last Modified: Jan. 10, 1990
Status: {No walkthrough|Informal|Formal|Accepted into Library}
Composition:
Aliases:
Comments:

ISL Filename.D

This is name of the file which contains the ISL commands which is extracted from the User Commands.
Date Created: Aug. 14, 1989
Last Modified: Jan. 10, 1990
Status: {No walkthrough|Informal|Formal|Accepted into Library}
Composition: name of file which is a maximum of six alphanumeric characters+a period+ISL.
Aliases:
Comments:

Message.D

This is an informative sentence that is stored in the message file. It may contain symbols which mark places in the message that will be replaced when the message is formatted by Display Message.
Date Created: Aug. 14, 1989
Last Modified: Jan. 10, 1990
Status: {No walkthrough|Informal|Formal|Accepted into Library}
Composition:
Aliases:
Comments: EX. A message may look like:
ICXXXX Invalid keyword '%S'.
where %S is a symbol that will be replaced with the exact string.

Message File.DS

This is a file which contains all the messages that the Ink Compiler displays to the user.
Date Created: Aug. 14, 1989
Last Modified: Aug. 14, 1989
Status: {No walkthrough|Informal|Formal|Accepted into Library}
Composition:
Aliases:
Comments:

Message Number.D

This is a number which corresponds to a particular message within the message file.
Date Created: Aug. 14, 1989
Last Modified: Aug. 14, 1989
Status: {No walkthrough|Informal|Formal|Accepted into Library}
Composition:
Aliases:
Comments:

New Entry.D

This is a new entry into the symbol table. The new entry is kept in temporary storage until it is appropriate to insert it into the symbol table.
Date Created: Nov. 2, 1989
Last Modified: Nov. 30, 1989
Status: {No walkthrough|Informal|Formal|Accepted into Library}

```
Composition: struct NEWENT {
    char *lex_p;
    short type;
    short length;
}newent;
char newsym[LEXLEN];   /* LEXLEN = 7 */
```

Figure 40:
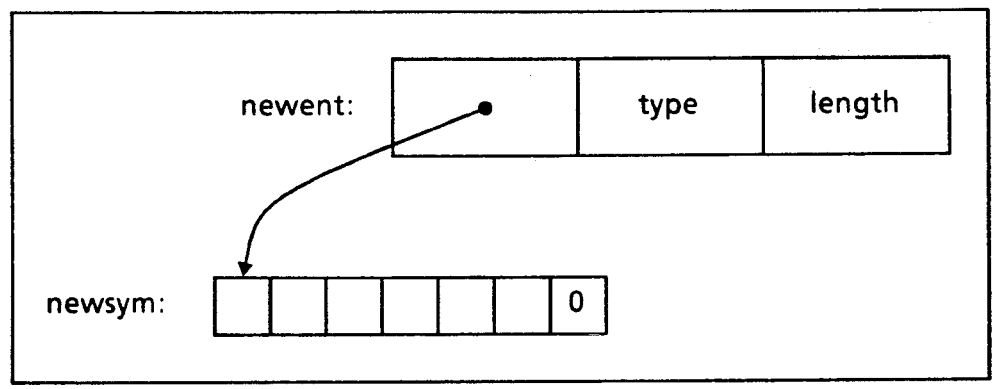
FIG. 40 shows a new entry being added to the new symbol table.

Aliases: newent, newsym
Comments: See FIG. 40.

New Symbol.D

This is a new symbol (name or identifier) to be inserted into the symbol table.
Date Created: Nov. 2, 1989
Last Modified: Nov. 2, 1989
Status: {No walkthrough|Informal|Formal|Accepted into Library}
Composition: char newsym[LEXLEN] /*LEXLEN=7*/
Aliases: newsym
Comments: See New Entry.

Options.D

This is part of the User Commands that tells the Ink Compiler what the user wants during the compilation process. The options that the user may specify in the User Command are: NOPRINT, REPLACE, NOREPLACE, TRAY, DISPLAY
Date Created: Jan. 10, 1990
Last Modified: Jan. 10, 1990
Status: {No walkthrough|Informal|Formal|Accepted into Library}
Composition:
Aliases:
Comments: See also User Command.

Source Records.D

These are 80 byte records from the user editable SL file that is specified in the ICO (compilation) command. Within these records are ISL commands, comments, and sequence numbers.
Date Created: Sep. 28, 1989
Last Modified: Sep. 28, 1989
Status: {No walkthrough|Informal|Formal|Accepted into Library}
Composition:
Aliases:
Comments:

Source File.D

See ISL File.
Date Created: Sep. 28, 1989
Last Modified: Sep. 28, 1989
Status: {No walkthrough|Informal|Formal|Accepted into Library}
Composition:
Aliases:
Comments:

Symbol Table.D

Table of labels which is built during the first (?) pass of the Ink Compiler. Each entry in the symbol table contains a pointer to the label itself (in ASCII), the type of label it is, and its attributes which may be a pointer to an options list or some other one word attribute.

There will be four markers into this table. One marker, called lstent, will mark the last position in the symbol table. Two other markers, called curcat and curpal, mark the beginning of the current icatalog and the current palette respectively. The fourth marker, called lstset, marks the last set (either palette, icatalog, or dfvl). When a new catalog or palette begins, all entries up to curcat or curpal are cleared, thus making available space in the symbol table.
Date Created: Sep. 11, 1989
Last Modified: Nov. 2, 1989
Status: {No walkthrough|Informal|Formal|Accepted into Library}

```
Composition: struct SYMTBL {
    char *lex_p;
    short type;
    void *attr_p;
    }symtbl[STMMAX];
    /* SYMMAX = 300; symbol
    table */
    char lexems[STRMAX];
    short lstent, curcat, curpal, lstset;
    short lstchr;
```

Figure 41:
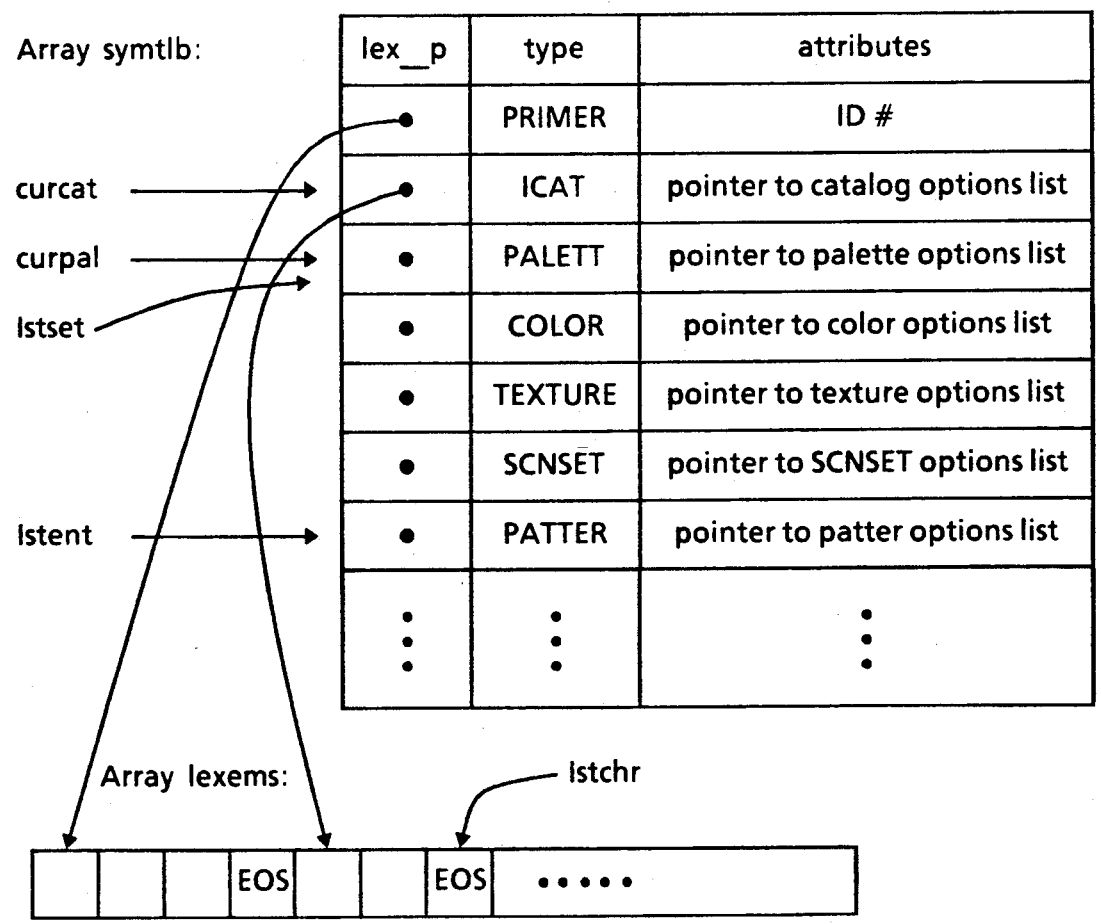
FIG. 41 shows the symbol table.

Aliases: symtbl, lexems. This table is shown in FIG. 41.

Token.D

This is a sequence of characters having a collective meaning.
Date Created: Aug. 14, 1989
Last Modified:
Status: {No walkthrough|Informal|Formal|Accepted into Library}
Composition:
Aliases:
Comments:

TMCB.D

Data that is transferred to OCS to spawn a print job.
Date Created: Sep. 28, 1989
Last Modified: Sep. 28, 1989
Status: {No walkthrough|Informal|Formal|Accepted into Library}
Composition:
Aliases:
Comments:

User Command.D this is the command line that the user entered to initiate compilation.
Date Created: Jan. 10, 1990
Last Modified: Jan. 10, 1990
Status: {No walkthrough|Informal|Formal|Accepted into Library}
Composition: ISL Filename+User Options
Aliases:
Comments: EX. A User Command looks like:
    ICO COMPILE JOANNE.ISL, TRAY
    where JOANNE.ISL is the ISL Filename, COMPILE and TRAY are User Options.

User Options.DS

Storage space holding flags which represent the options the user specified when the User Command was entered.
Date Created: Jan. 10, 1990
Last Modified: Jan. 10, 1990
Status: {No walkthrough|Informal|Formal|Accepted into Library}
Composition:
Aliases:
Comments: Command Structure Definitions
Note: These are not in alphabetic order.

NOTYPE structure.D

A fixed length structure.
Date Created: Nov. 14, 1989
Last Modified: Nov. 14, 1989

Status: {No walkthrough|Informal|Formal|Accepted into Library}

Composition: [type + optional number of items], see FIG. 42
```
struct NOTYPE {
    void *link_p;
    char type;
    char noopts;
};
```

Aliases:

Comments:

ICATALOG structure.D

A fixed length structure containing ICATALOG information.

Date Created: Aug. 14, 1989

Last Modified:

Status: {No walkthrough|Informal|Formal|Accepted into Library}

Composition: [type 1 + optional number of items + RAD50 filename], see FIG. 43.
```
struct CMDSTR {
    char type;
    char noopts;
    unsigned short r50nam[2];
    unsigned short idlen;
    void *ptr_p;
};
```

Aliases:

Comments:

PRIMARY structure.D

A fixed length structure containing PRIMARY information.

Date Created: Aug. 14, 1989

Last Modified:

Status: {No walkthrough|Informal|Formal|Accepted into Library}

Composition: [type 2 + optional number of items + RAD50 filename + ID number], see FIG. 44
```
struct CMDSTR {
    char type;
    char noopts;
    unsigned short r50nam[2];
    unsigned short idlen;
    void *ptr_p;
};
```

Aliases:

Comments:

PALETTE structure.D

A fixed length structure containing PALETTE information.

Date Created: Aug. 14, 1989

Last Modified:

Status: {No walkthrough|Informal|Formal|Accepted into Library}

Composition: [type 3 + optional number of items + RAD50 filename], see FIG. 45
```
struct CMDSTR {
    char type;
    char noopts;
    unsigned short r50nam[2];
    unsigned short idlen;
    void *ptr_p;
};
```

Aliases:

Comments:

COLOR structure.D

A variable length structure containing COLOR information.

Date Created: Aug. 14, 1989

Last Modified:

Status: {No walkthrough|Informal|Formal|Accepted into Library}

Composition: [type 4 + optional number of items + RAD50 filename + length + COLOR Sub-Option(s)], see FIG. 46
```
struct CMDSTR {
    char type;
    char noopts;
    unsigned short r50nam[2];
    unsigned short idlen;
    void *ptr_p;
};
```

Aliases:

Comments:

COLOR Sub-Option.D

This is either a Value Sub-Option structure or any one of the COPTS Sub-Options structures.

Date Created: Aug. 14, 1989

Last Modified:

Status: {No walkthrough|Informal|Formal|Accepted into Library}

Composition:

Aliases:

Comments:

Model Sub-Option structure.D

A fixed length structure containing information for the Model Sub-Option of the COLOR, COPTS, SCREEN, and SOPTS commands.

Date Created: Aug. 14, 1989

Last Modified:

Status: {No walkthrough|Informal|Formal|Accepted into Library}

Composition: [type 4A + optional number of items + flagword], see FIG. 47.
```
struct FOURA {
    void *link_p;
    char type;
    char noopts;
    unsigned short flgwrd;
};
```

Aliases:

Comments: flagword values:
  1=MONOCHROME
  2=TINT
  3=HSM
  4=RGB

Scnset Sub-Option structure.D

A fixed length structure containing information for the Scnset Sub-Option of the COLOR and COPTS commands.
Date Created: Aug. 14, 1989
Last Modified:
Status: {No walkthrough|Informal|Formal|Accepted into Library}

Composition: [type 4B + optional number of items + RAD50 name], see FIG. 48
```
struct FOURB {
    void *link_p;
    char type;
    char noopts;
    unsigned short r50nam[2];
};
```

Aliases:
Comments: The RAD50 name is zero if DEFAULT is selectedotherwise RAD50 name is the screensetname.

Primary Sub-Option structure.D

A variable length structure containing information for the Primary Sub-Option of the COLOR and COPTS commands.
Date Created: Aug. 14, 1989
Last Modified:
Status: {No walkthrough|Informal|Formal|Accepted into Library}

Composition: [type 4C + optional number of items + length + RAD50 filename(s)], see FIG. 49.
```
struct FOURC {
    void *link_p;
    char type;
    char noopts;
    unsigned short length;
    unsigned short r50nam[0];
};
struct R50BLK {
    unsigned short r50nam[2];
};
```

Aliases:
Comments: The RAD50 name can be BLACK or any other primaryname.

Values Sub-Option structure.D

A variable length structure containing information for the Values Sub-Option of the COLOR command.
Date Created: Aug. 14, 1989
Last Modified:
Status: {No walkthrough|Informal|Formal|Accepted into Library}

Composition: [type 4D + optional number of items + length + number(s)],see FIG. 50
```
struct FOURD {
    void *link_p;
    char type;
    char noopts;
    unsigned short length;
    unsigned short number[0];
};
```

Aliases:
Comments: The RAD50 name can be BLACK or any other primaryname.

COPTS structure.D

A variable length structure containing COPTS information.
Date Created: Aug. 14, 1989
Last Modified:
Status: {No walkthrough|Informal|Formal|Accepted into Library}

Composition: [type 5 + optional number of items + length + COPTS Sub-Option(s)], see FIG. 51.
```
struct CMDSTR {
    char type;
    char noopts;
    unsigned short r50nam[2];
    unsigned short idlen;
    void *ptr_p;
};
```

Aliases:
Comments:

COPTS Sub-Option.D

This is either a Primary Sub-Option structure, a Model Sub-Option structure, or a Scnset Sub-Option structure.
Date Created: Aug. 14, 1989
Last Modified:
Status: {No walkthrough|Informal|Formal|Accepted into Library}
Composition:
Aliases:
Comments:

SCNSET structure.D

A fixed length structure containing SCNSET information.
Date Created: Aug. 14, 1989
Last Modified:
Status: {No walkthrough|Informal|Formal|Accepted into Library}

Composition: [type 6 + optional number of items + RAD50 filename], see FIG. 52.
```
struct CMDSTR {
    char type;
    char noopts;
    unsigned short r50nam[2];
    unsigned short idlen;
    void *ptr_p;
};
```

Aliases:
Comments:

SCREEN structure.D

A variable length structure containing SCREEN information.
Date Created: Aug. 14, 1989
Last Modified:
Status: {No walkthrough|Informal|Formal|Accepted into Library}

Composition: [type 7 + optional number of items + length + SCREEN Sub-Option(s)]. see FIG. 53
```
struct CMDSTR {
    char type;
    char noopts;
    unsigned short r50nam[2];
    unsigned short idlen;
    void *ptr_p;
};
```

Aliases:
Comments:

SCREEN Sub-Option.D

This is either a Values Sub-Option structure, a Data Sub-Option structure, a Pindex Sub-Option structure, or any one of the SOPTS Sub-Options.
Date Created: Aug. 14, 1989
Last Modified:
Status: {No walkthrough|Informal|Formal|Accepted into Library}
Composition:
Aliases:
Comments:

Data Sub-Option structure.D

A variable length structure containing information for the Data Sub-Option of the SCREEN and PATTERN commands.
Date Created: Aug. 14, 1989
Last Modified:
Status: {No walkthrough|Informal|Formal|Accepted into Library}

Composition: [type 7A + optional number of items + length + number(s)], see FIG. 54
```
struct VARNUM {
    void *link_p;
    char type;
    char noopts;
    unsigned short length;
    unsigned short number[0];
};
```

Aliases:
Comments:

Size Sub-Option structure.D

A fixed length structure containing information for the Size Sub-Option of the SCREEN, SOPTS, PATTERN, and POPTS commands.
Date Created: Aug. 14, 1989
Last Modified:
Status: {No walkthrough|Informal|Formal|Accepted into Library}

Composition: [type 7B + optional number of items + number + number], see FIG. 55.
```
struct SEVENB {
    void *link_p;
    char type;
    char noopts;
    unsigned short number[2];
};
```

Aliases:
Comments:

Dtype Sub-Option structure.D

A fixed length structure containing information for the Dtype Sub-Option of the SCREEN, SOPTS, PATTERN, and POPTS commands.
Date Created: Aug. 14, 1989
Last Modified:
Status: {No walkthrough|Informal|Formal|Accepted into Library}

Composition: [type 7C + optional number of items + flagword], see FIG. 56.
```
struct SEVENC {
    void *link_p;
    char type;
    char noopts;
    unsigned short flgwrd;
};
```

Aliases:
Comments: flagword values:
1 = BINARY
2 = OCTAL
3 = HEX
4 = DECIMAL

Plib Sub-Option structure.D

A fixed length structure containing information for the Plig Sub-Option of the SCREEN, SOPTS, PATTERN, and POPTS commands.
Date Created: Aug. 14, 1989
Last Modified:
Status: {No walkthrough|Informal|Formal|Accepted into Library}

Composition: [type 7D + optional number of items + RAD50 filename], see FIG. 57.
```
struct SEVEND {
    void *link_p;
    char type;
    char noopts;
    unsigned short r50nam[2];
};
```

Aliases:
Comments:

Pindex Sub-Option structure.D

A variable length structure containing information for the Pindex Sub-Option of the SCREEN and PATTERN commands.
Date Created: Aug. 14, 1989
Last Modified:
Status: {No walkthrough|Informal|Formal|Accepted into Library}

Composition: [type 7E + optional number of items + length + index(es)], see FIG. 58.
```
struct VARNUM {
    void *link_p;
    char type;
    char noopts;
    unsigned short length;
    unsigned short number[0];
};
```

Aliases:
Comments:

SOPTS structure.D

A variable length structure containing SOPTS information.
Date Created: Aug. 14, 1989
Last Modified:
Status: {No walkthrough|Informal|Formal|Accepted into Library}

Composition: [type 8 + optional number of items + length + SOPTS Sub-Option(s)], see FIG. 59.
```
struct CMDSTR {
    char type;
    char noopts;
    unsigned short r50nam[2];
    unsigned short idlen;
    void *ptr_p;
};
```

Aliases:
Comments:

SOPTS Sub-Option.D

This is either the Model Sub-Option structure, the Dtype Sub-Option structure, the Size Sub-Option structure, or the Plib Sub-Option.
Date Created: Aug. 14, 1989
Last Modified:
Status: {No walkthrough|Informal|Formal|Accepted into Library}
Composition:
Aliases:
Comments:

TEXTURE structure.D

A variable length structure containing TEXTURE information.
Date Created: Aug. 14, 1989
Last Modified:
Status: {No walkthrough|Informal|Formal|Accepted into Library}

Composition: [type 9 + optional number of items + RAD50 filename + length + TEXTURE Sub-Option(s)], see FIG. 60.
```
struct CMDSTR {
    char type;
    char noopts;
    unsigned short r50nam[2];
    unsigned short idlen;
    void *ptr_p;
};
```

Aliases:
Comments:

TEXTURE Sub-Option.D

This is a Pattern Sub-Option structure or an Ink Sub-Option structure.
Date Created: Aug. 14, 1989
Last Modified:
Status: {No walkthrough|Informal|Formal|Accepted into Library}
Composition:
Aliases:
Comments:

Pattern Sub-Option structure.D

A variable length structure containing information for the Pattern Sub-Option of the TEXTURE command.
Date Created: Aug. 14, 1989
Last Modified:
Status: {No walkthrough|Informal|Formal|Accepted into Library}

Composition: [type 9A + optional number of items +length + RAD50 filename(s),], see FIG. 61.
```
struct VARNAM {
    void *link_p;
    char type;
    char noopts;
    unsigned short length;
    unsigned short r50nam[0];
};
```

Aliases:
Comments: The number of items in this structure must equal the number of items in the corresponding Ink Sub-Option structure.

Ink Sub-Option structure.D

A variable length structure containing information for the Ink Sub-Option for the TEXTURE command.
Date Created: Aug. 14, 1989
Last Modified:
Status: {No walkthrough|Informal|Formal|Accepted into Library}

Composition: [type 9B + optional number of items +length + RAD50 filename(s)], see FIG. 62.
```
struct VARNAM {
    void *link_p;
    char type;
    char noopts;
    unsigned short length;
    unsigned short r50nam[0];
};
```

Aliases:
Comments: The number of items in this structure must equal the number of items in the corresponding Pattern Sub-Option structure.

PATTERN structure.D

A variable length structure containing PATTERN information.
Date Created: Aug. 14, 1989
Last Modified:
Status: {No walkthrough|Informal|Formal|Accepted into Library}

Composition: [type 10 + optional number of items + RAD50 filename + length + PATTERN Sub-Option(s)], see FIG. 63.
```
struct CMDSTR {
    char type;
    char noopts;
    unsigned short r50nam[2];
    unsigned short idlen;
    void *ptr_p;
};
```

Aliases:
Comments:

PATTERN Sub-Option.D

This any one of the POPTS Sub-Options structure, a DATA Sub-Option structure, or a Pindex Sub-Option structure.
Date Created: Aug. 14, 1989
Last Modified:
Status: {No walkthrough|Informal|Formal|Accepted into Library}
Composition:
Aliases:
Comments:

POPTS structure.D

A variable lengths structure containing PATTERN information.
Date Created: Aug. 14, 1989
Last Modified:
Status: {No walkthrough|Informal|Formal|Accepted into Library}

Composition: [type 11 + optional number of items + length + POPTS Sub-Option(s)], see FIG. 64.
```
struct CMDSTR {
    char type;
    char noopts;
    unsigned short r50nam[2];
    unsigned short idlen;
    void *ptr_p;
};
```

Aliases:
Comments:

POPTS Sub-Option structure.D

This is either a Dtype Sub-Option structure, Size Sub-Option structure, or Plib Sub-Option structure.
Date Created: Aug. 14, 1989
Last Modified:
Status: {No walkthrough|Informal|Formal|Accepted into Library}
Composition:
Aliases:
Comments:

END structure.D

A fixed length structure for the END command.
Date Created: Nov. 14, 1989
Last Modified: Nov. 14, 1989
Status: {No walkthrough|Informal|Formal|Accepted into Library}

Composition: [type 12 + optional number of items], see FIG. 65.
```
struct CMDSTR {
    char type;
    char noopts;
    unsigned short r50nam[2];
    unsigned short idlen;
    void *ptr_p;
};
```

Aliases:
Comments: Because Leading Dots Characters and Trailing Dots Characters are padded to 16 bits in width to permit portions of their bitmaps to be used as Left Corner Characters and Right Corner Characters (respectively), when Leading Dots Characters and Trailing Dots Characters are dimensioned for use as lower left corner and lower right corner fill characters, their x-dimension must be specified as 2 bytes (16 bits).

The large fill character is used to provide most of the fill for any rectangular area. It is 32 bits wide by 32 bits high (extended to 1024 bits wide via the CDF horizontal repeat function in order to reduce the number of DL characters required to fill a rectangle). The Dimension meta-code is used to truncate the width of the fill to within 7 dots of the desired fill boundary. No similar technique exists to enlarge the pattern in the scan direction. Therefore, a new DL is required for each 32 scans. The Dimension meta-code is used to truncate the height of the fill to the desired scan line boundary.

TABLE 1.1

CD Meta Codes and CD Codes (Sorted by Meta Code)

| Meta Code (from DL) | CD Code (mapped) from FST | Meaning | Followed by: This # of bytes | These bytes mean: | Notes |
|---|---|---|---|---|---|
| Many different codes (usually all otherwise unused meta codes below 40 and also unused character values within font. | 4 | Space | 0 | | Spacing value is taken from FSS word in FST. |
| No specific value | 14 | Graphic Space X | 0 | | Not used in any Xerox font. |
| No specific value | 15 | Graphic Space Y | 0 | | Not used in any Xerox font. |
| 0 | 7 | Font Switch (FS) | 1 | Font index | |
| 1 | 2 | End of Line (EOL) | 0 | | |
| 2 | 1 | Landscape (LS) | 0 | | |
| 3 | 3 | Overlay | 0 | | |
| 4 | 5 | Abs Dot | 2 | Next dot address | |
| 5 | 6 | Rel Dot (RD) | 2 | Offset to next dot address | |
| 6 | 10 | Absolute Scan | 2 | Next scan line | |
| 7 | 11 | Relative Scan | 2 | Offset to next scan line | |
| 10 | 12 | Dimension (DIM) | 2 | Replaces FS dimension value | |
| 11 | 13 | Portrait | 0 | | |
| 12 | 20 | Highlight Color Start (HCS) | 0 | | Used only in inks in conjunction with fill characters |
| 13 | 21 | Highlight Color End (HCE) | 0 | | Used only in inks in conjunction with fill characters |
| 14 | 20 | Highlight Color Start (HCS) | 0 | | |

TABLE 1.1-continued

| Meta Code (from DL) | CD Code (mapped) from FST) | Meaning | This # of bytes | These bytes mean: | Notes |
|---|---|---|---|---|---|
| | | CD Meta Codes and CD Codes (Sorted by Meta Code) | | Followed by: | |
| 15 | 21 | Highlight Color End (HCE) | 0 | | |
| 16 | 16 | Extended Dimension | 4 | Replaces FS dimension value | |
| 17 | 17 | Escape | n | Prefix for extended codes | | all values are octal

Large fill is positioned with a fixed relationship to the page, e.g. as a page-registered ink. As a result, additional characters are required to complete the fill. Leading dots characters fill the dots before large fill on the scan line. Trailing dots characters fill the dots following the large fill on the scan line. Leading scans characters fill the scan lines before the large fill. There are no trailing scan characters since the large fill character can be truncated in the scan direction using a Dimension meta-code. Left corner characters are used to fill the upper-left corner. Right corner characters are used to fill the upper right corner. Fill for the lower left corner is formed by truncating a leading dots character using the Dimension meta-code. Fill for the lower right corner is formed by truncating a trailing dots character using the Dimension meta-code.

Leading dot characters provide fill between the left fill boundary and the page-registered positioning of large fill. A character is required for each width from 1 to inkSizeX-1 dots (e.g., from 1 to 7 dots given an 8×8 ink size). The characters contain the rightmost bits of the ink pattern. All leading dots characters are 32 bits high to match the height of large fill character. Bitmaps are padded to 16 bits in width to permit portions of the bitmap to be used as (upper) left corner characters. When dimensioned for use as lower left corner fill characters, their x-dimension must be specified as 2 bytes (16 bits).

Trailing dots characters provide fill between the Dimension meta-code truncation of large fill and the right fill boundary. A character is required for each width from 1 to inkSizeX-1 dots (e.g., from 1 to 7 dots given an 8×8 ink size). The characters contain the leftmost bits of the ink pattern. All trailing dots characters are 32 bits high to match the height of large fill character. Bitmaps are padded to 16 bits in width to permit portions of the bitmap to be used as (upper) right corner characters. When dimensioned for use as lower right corner fill characters, their x-dimension must be specified as 2 bytes (16 bits).

Leading scans characters provide fill between the top fill boundary and the page-registered positioning of large fill. Separate bitmaps for these characters are not necessary; their FST entries point into the bitmaps for the large fill character. A character is required for each height from 1 to inkSizeY-1 scans (e.g., from 1 to 7 scans given an 8×8 ink size). The characters contain the last scans of the ink pattern. All leading scans characters are 32 bits wide (extended to 1024 bits wide via the CDF horizontal repeat function, to match the width of the large fill character). The Dimension meta-code is used to truncate the width of the fill to within 7 dots of the desired fill boundary.

Left corner characters provide fill between the origin of the fill (upper left corner) and the page-registered origin of large fill. Separate bitmaps for these characters are not necessary; their FST entries point into the bitmaps for leading dots characters. Character codes are required for heights from 1 to inkSizeY-1 scans for each leading dot character (e.g., from 1 to 7 scans given an 8×8 ink size). The total number of character codes required is (inkSizeX-1)*(inkSizeY-1)=7*7=49.

Right corner characters provide fill between the Dimension meta-code truncation of leading scan fill and the right fill boundary (upper right corner). Separate bitmaps for these characters are not necessary; the FST entries for these characters can point into the bitmaps for trailing dots characters. Character codes are required for heights from 1 to inkSizeY-1 scans for each trailing dot character (e.g., from 1 to 7 scans given an 8×8 ink size). The total number of character codes required is (inkSizeX-1)*(inkSizeY-1)=7*7=49.

An ink implements the fill characters for the two primaries that comprise every ink. FIGS. 30, 31 and 32 show the character code assignments for the black and color fill characters. Black fill characters should be preceded in the DL by the HighlightColorEnd meta-code using character code O'13' from the ink; color fill characters should be preceded in the DL by the HighlightColorStart meta-code using character code O'12' from the ink. FIGS. 33 and 34 show some sizing information for color inks.

Figure 35:
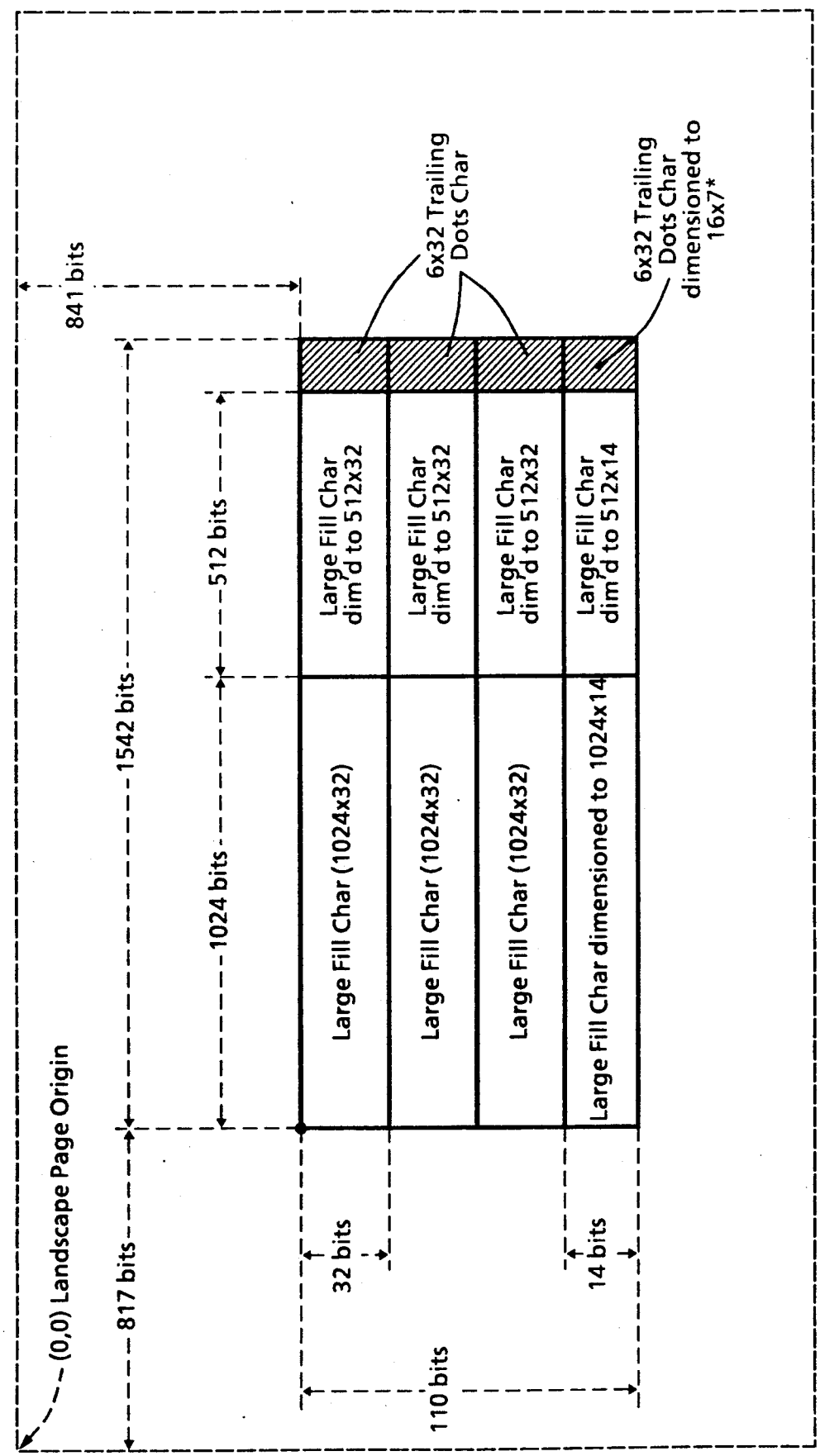
FIG. 35 is an example of filling a box using ink texture.

Texture fill is accomplished using a single large fill character which is repeated and trimmed to size using the Dimension meta-code. By registering the texture to the rectangle being filled, the area can be filled to within 7 dots of the right edge of the rectangle. Trailing dots fill characters are used to fill the remaining space. This is illustrated in FIG. 35.

The large fill character is repeated, as necessary, in the DLs to provide most of the fill for the rectangular area. If the area is not covered exactly using large fill, one additional large fill character is added to the DL and trimmed using the Dimension meta-code. Since trimming is only to a byte boundary in the scan direction, additional dots are filled using trailing dots characters. The large fill character contains the complete texture pattern.

Trailing dots characters provide fill between the Dimension meta-code truncation of large fill and the right fill boundary. A character is required for widths from 1 to 7 bits for each byte of width of the texture. The height of the characters is the same as that of the large fill character.

The following are fill algorithms.

Note that all calculations in this section assume integer arithmetic.
Definitions Variables
    inkHandle descriptor for ink to be used; contains inkSizeX and inkSizeY
    inkSizeXsize of ink in bits along a scan line
    inkSizeYnumber of scan lines contained in the ink
    fillLocX dot address where fill is to start
    fillLocY scan address where fill is to start
    fillSizeX number of dots to fill
    fillSizeY number of scans to fill
Constants
    largeFillPatX = 1024 dots per scan for large fill pattern(constant)
    largeFillPatY = 32 number of scans in large fill pattern(constant)
    landscape = landscape meta-code
    lightlightColorStart = highlight color start meta-code
    highlightColorEnd = highlight color end meta-code
    endOfline = end of line meta-code
Functions
    createDL(scanline,dotAddress)
        create a DL and add it to the current TL
    putDL(data)
        add one or more bytes to the current DL
    dimendion8(x,y)
        create the character sequence for a dimension meta-code to set
        the specifies x and y dimensions, rounding x to an 8-bit boundary
    dimension16(x,y)
        create the character sequence for a dimension meta-code to set
        the specified x and y dimensions, rounding x to a 16-bit boundary
    relativeDot(x)
        create the character sequence for a relative dot positioning
        meta-code to change the current X-position.
    colorLargeFillChar()
        calculate the character code of the large fill character
        colorLargeFillChar()
        = baseChar
    leadingDotsChar(leadingDots)
        calculate character code of leading dot character
        leadingDotsChar(leadingDots)
        = baseChar + leadingDots
    trailingDotsChar(trailingDots)
        calculate character code of trailing dot character
        trailingDotsChar(trailingDots)
            = baseChar + (inkSizeX − 1) + trailingDots
            = baseChar + inkSizeX + trailingDots − 1
    leadingScansChar(leadingScans)
        calculate character code of leading scans character
        leadingScansChar(leadingScans)
            = baseChar + (inkSizeX − 1) + (inkSizeX − 1) + leadingScans
    leftCornerChar(leadingDots,leadingScans)
        calculate character code of left corner character
        leftCornerChar(leadingDots,leadingScans)
            = baseChar + (2*(inkSizeX − 1)) + (inkSizeY − 1) +
                ((leadingDots − 1)*(inkSizeY − 1)) + leadingScans
            = baseChar + (2*inkSizeX) + inkSize + ((leadingDots −
                1)*(inkSizeY − 1)) + leadingScans − 3
    rightCornerChar(trailingDots,leadingScans)
        calculate character code of right corner character
        rightCornerChar(trailingDots,leadingScans)
            = baseChar + (2*(inkSizeX − 1)) + (inkSizeY − 1) +
                ((inkSizeX − 1)*(inkSizeY − 1)) + ((trailingDots −
                1)*(inkSizeY − 1)) + leadingScans
            = baseChar + (inkSizeX*inkSizeY) + inkSizeX +
                ((trailingDots − 1)*(inkSizeY − 1)) + leadingScans − 2
    textureLargeFillChar = baseChar
        calculate the character code of the large fill character
    textureTrailingDotsChar(trailingDots)
        calculate character code of trailing dot character
        textureTrailingDotsChar(trailingDots)
            = baseChar + trailingDots
    All calculations use integer arithmetic with truncation
    $\Gamma_n X$ = X rounded up to next n boundary = $(X+n-1)/n*n$
Color Fill Function    This function fills an area starting at the point(fillLocX,
                      fillLocY)with dimensions fillSizeX by fillSizeY using the
                      page-registered ink pointed to by inkHandle.
DEFINEcolorFill(fillLocX,fillLocY,fillSizeX,fillSizeY,inkHandle)
baseChar = 16/* Use black fill character set*/
fillPlane(fillLocX,fillLocY,fillSizeX,fillSizeY,inkHandle,
highlightColorEnd)
baseChar = 136 /* use highlight color fill character set*/
fillPlane(fillLocX,fillLocY,fillSizeX,fillSizeY,inkHandle,
highlightColorStart)
ENDDEFINE -continued
```
DEFINE fillPlane(fillLocX,fillLocY,fillSizeX,fillSizeY,inkHandle,
colorMetacode)
inkSizeX = inkHandle.inkSizeX
inkSizeY = inkHandle.inkSizeY
largeFillLocX = $\Gamma_{inkSizeX}$fillLocX
leadinDots = min(fillSize,X,largeFillLocX−fillLocX)
largeFillByteCount = (fillSizeX − leadingDots)/8
xRepeatCount = 8*largeFillByteCount/largeFillPatX
xRemainingByteCount = largeFillByteCount − (xRepeatCount *
(largeFillPatX/8))
trailingDots = fillSizeX − leadingDots − largeFillByteCount *8
largeFillLocY = $\Gamma_{inkSizeY}$fillLocY
leadingScans = min(fillSizeY,largeFillLocY − fillLocY)
yRepeatCount = (fillSizeY − leadingScans)/largeFillPatY
trailingScans = fillSizeY − leadingScans − yRepeatCount*largeFillPatY
current=fillLocY
current=fillLocX
IF leadingScans <> 0 THEN
    createDL(scanLine = currentY,dotAddress=currentX)
    putDL(colorMetacode)
    putDL(landscape)
    IF leadingDots <> 0 THEN
       putDL(leftCornerChar(leadingDots,leadingScans))
    ENDIF
    REPEATxRepeatCount
       putDL(leadingScanChar(leadingScans));
    ENDREPEAT
    IF xRemainingByteCount <> 0
       putDL(dimension8(xRemainingByteCount*8, leadingScans))
putDL(leadingScanChar(leadingScans))
put(relativeDot(xRemainingByteCount*8−(largeFillPatX)))
    ENDIF
    IF trailingDots <> 0 THEN
       putDL(rightCornerChar(trailingDots,leadingScans))
    ENDIF
    putDL(endOfLine)
    currentY = currentY + leadingScans
ENDIF
REPEATyRepeatCount
    createDL(scanLine=currentY,dotAddress=currentX)
    putDL(colorMetacode)
    putDL(landscape)
    IFleadingDots <> 0
       putDL(leadingDotsChar(leadingDots))
    ENDIF
    REPEATxRepeatCount
       putDL(colorLargeFillChar);
    ENDREPEAT
    IFxRemainingByteCount <> 0 THEN
       putDL(dimension8(xRemainingByteCount*8,largeFillPatY))
       putDL(colorLargeFillChar)
       putDL(relativeDot(xRemainingByteCount*8−(largeFillPat)))
    ENDIF
    IFtrailingDots <> 0 THEN
       putDL(trailingDotsChar(trailingDots))
    ENDIF
    putDL(endOfLine)
    currentY=currentY + largeFillPatY
ENDREPEAT
IFtrailingScans <> 0 THEN
    createDL(scanLine=currentY,dotAddress=currentX)
    putDL(colorMetacode)
    putDL(landscape)
    IFleadingDots <> 0 THEN
       putDL(dimension16(leadingDots,trailingScans))
       putDL(leadingDotsChar(leadingDots))
    ENDIF
    REPEATxRepeatCount
       putDL(dimension8(largeFillPatX,trailingScans))
       putDL(colorLargeFillChar)
    ENDREPEAT
    IFxRemainingByteCount <> 0 THEN
       putDL(dimenions8(xRemainingByteCount*8,trailingScans))
putDL(colorLargeFillChar)
putDL(relativeDot(xRemainingByteCount*8−(largeFillPatX)))
    ENDIF
    IFtrailingDots <> 0 THEN
       putDL(dimension16(trailingDots,trailingScans))
       putDL(trailingDotsChar(trailingDots))
       putDL(endOfLine)
    ENDIF
ENDIF
```

-continued

ENDDEFINE

| Texture Fill Function | This Function fills an area starting at the point (fillLocX,fillLocY)with dimensions fillSizeX by fillSizeY using the texture pointed to by inkHandle. TBD(pending further definition). |
|---|---|
| Issues | 1. One eighth of the trailingDots characters for texture fill can be eliminated since they correspond to byte boundaries that can be achieved using the dimension meta-code. |
| | 2. For mixed fill, what is the tradeoff between the number of DLs and use of absolute positioning within a single DL |
| | 3. A character height of 32 scans was chosen to keep the system load imposed by inking similar to that of processing characters. |

A TL/DL structure to image the filled box is illustrated in FIG. 39.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A two color printer having a memory, which printer uses two primary colorants having different colors to print, on an output medium which has a color, a highlight area of variable size in a predetermined color which color is a combination of the color of the medium and the two primary colorants, comprising:

a number of fonts in said printer memory, each font differing from the other fonts only in color, each font comprising a number of characters that differ from each other only in size and shape, each character comprising two equally sized and shaped bit maps, each bit map comprising bits, one bit map having a pattern of bits indicate pixels to be printed in one colorant, the other bit map having a pattern of bits indicate pixels to be printed in the other colorant, a resultant patterns of pixels, and therefore the color of the character, being equal for all characters in a font.

2. The printer of claim 1 further comprising:

a print job controller to control said printer which controller specifies for said highlight area the characters of a font to be used to print the hightlight area, said characters exactly covering said area by use of either whole characters or characters with a reduced area on one edge, where original edges of said reduced characters are positioned against other characters of the highlight area, and the reduced edges are positioned along a periphery of said highlight area.

* * * * *